US010291790B2

(12) United States Patent
Seetharaman et al.

(10) Patent No.: US 10,291,790 B2
(45) Date of Patent: May 14, 2019

(54) SYSTEM AND METHOD FOR DYNAMIC CHARGING IN COMMUNICATION NETWORKS

(71) Applicant: WIPRO LIMITED, Bangalore (IN)

(72) Inventors: Swaminathan Seetharaman, Chennai (IN); Madhavan Kalyanaraman, Chennai (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/818,956

(22) Filed: Nov. 21, 2017

(65) Prior Publication Data

US 2019/0109949 A1 Apr. 11, 2019

(30) Foreign Application Priority Data

Oct. 6, 2017 (IN) .............................. 201741035470

(51) Int. Cl.
| | |
|---|---|
| *H04W 28/08* | (2009.01) |
| *H04K 1/00* | (2006.01) |
| *H04M 15/00* | (2006.01) |
| *H04W 4/24* | (2018.01) |

(52) U.S. Cl.
CPC ....... *H04M 15/8016* (2013.01); *H04M 15/59* (2013.01); *H04W 4/24* (2013.01)

(58) Field of Classification Search
CPC ....... H04W 88/04; H04W 36/245; H04K 1/00
USPC ............................................ 455/406, 456.3
See application file for complete search history.

(56) References Cited

U.S. PATENT DOCUMENTS

| | | | |
|---|---|---|---|
| 5,991,378 A | 11/1999 | Apel | |
| 6,606,744 B1* | 8/2003 | Mikurak | H04L 29/06 717/174 |
| 7,269,657 B1* | 9/2007 | Alexander | H04L 47/115 370/230 |
| 7,716,077 B1* | 5/2010 | Mikurak | G06Q 10/06 705/7.12 |
| 7,957,991 B2* | 6/2011 | Mikurak | G06Q 10/06 705/7.11 |
| 8,271,336 B2* | 9/2012 | Mikurak | G06Q 10/087 705/22 |
| 8,635,335 B2* | 1/2014 | Raleigh | H04W 36/245 709/224 |
| 2002/0002622 A1* | 1/2002 | Vange | G06F 9/5027 709/245 |
| 2004/0184483 A1* | 9/2004 | Okamura | H04L 47/10 370/477 |

(Continued)

*Primary Examiner* — William D Cumming
(74) *Attorney, Agent, or Firm* — Finnegan, Henderson, Farabow, Garrett & Dunner, LLP

(57) ABSTRACT

A method for dynamic charging in a communication network is provided. The method may include dynamically determining a charging rate for the communication session upon initiation of a communication session, based on at least one of an estimated quality of service and a dynamically determined inter-network charging rate for the communication session. The method may further include initiating charging for the communication session based on the determined charging rate, monitoring at least an actual quality of service for the communication session with respect to the estimated quality of service for a duration of the communication session, and dynamically updating the determined charging rate based on the monitoring.

20 Claims, 6 Drawing Sheets

(56) References Cited

U.S. PATENT DOCUMENTS

| | | | |
|---|---|---|---|
| 2006/0262931 A1* | 11/2006 | Nakano | H04L 63/0428 380/270 |
| 2007/0060101 A1* | 3/2007 | Duan | H04L 12/14 455/406 |
| 2007/0115861 A1* | 5/2007 | Zhang | H04L 12/14 370/259 |
| 2007/0123213 A1* | 5/2007 | Wu | H04L 12/14 455/406 |
| 2008/0046963 A1* | 2/2008 | Grayson | H04L 12/66 726/1 |
| 2009/0046676 A1* | 2/2009 | Krishnaswamy | H04L 63/029 370/338 |
| 2009/0073943 A1* | 3/2009 | Krishnaswamy | H04W 88/04 370/338 |
| 2012/0198058 A1* | 8/2012 | Pogorelik | G06Q 10/04 709/224 |
| 2016/0127380 A1* | 5/2016 | Steele | H04L 63/102 726/7 |

\* cited by examiner

SYSTEM AND METHOD FOR DYNAMIC CHARGING IN COMMUNICATION NETWORKS

TECHNICAL FIELD

This disclosure relates generally to communication network, and more particularly to a system and method for dynamic charging in communication networks.

BACKGROUND

Various modes of telecommunication have not only revolutionized the way we communicate, but in today's world have also changed the way we do business, and the way we live our lives. Today, various modes of telecommunication are increasingly used to perform various functions such as streaming multimedia content, playing high definition online games, enabling video calls, and so forth in addition to basic voice calls. Each of these functions and other functions may require network resources. It may be therefore important to efficiently and effectively charge (i.e., bill) such communication sessions.

Existing techniques may typically provide for static charging for a communication session (i.e., charging using static policies/rules) based on a variety of factors such as time of day (e.g., day, night, etc.), session type (e.g., local call, ISD, etc.), characteristics of session (e.g., video call, etc.), resources required (e.g., bandwidth, volume of data, etc.), class of user (premium user, normal user, etc.), and so forth. However, static charging techniques may have certain limitations. For example, operator may lose out on the revenue in case of network congestion, for ensuring resource availability for the initiated session-maintenance and for taking steps to ensure desired service quality. Conversely, user may be compelled to pay undue charges to the operator even in case of service interruptions and receipt of degraded service quality.

Some of the existing techniques may provide for dynamic charging based on the network load conditions and the resources requested by the end-user, However, existing dynamic charging techniques may have certain limitations. For example, existing dynamic charging techniques may propose for estimation of the charging rate based on network load conditions at the start of the session, and for updating of the charging rate during the session based on periodic assessment of network load condition, which in turn may be based on periodic information received from network elements. However, initial charge estimation based on instantaneous network load conditions and resource availability may be inaccurate (e.g., over-estimation in case of overloaded network, under-estimation in case of under-loaded network, etc.). Further, frequent load reporting by the network elements may result in processing and transmission overheads. If the frequency of reporting is decreased (i.e., reporting at longer interval), some of the charging related conditions/events may get missed out, leading to inaccurate determination of charging, thereby defeating the purpose of determining charging based on dynamic network load conditions during the session. These issues may get further aggravated when the network congestion level is high due to load or other factors. Thus, existing dynamic charging techniques may result in inappropriate determination of charging-rate at the service-session initiation and during the service-session. Also, the processing and transmission overhead may impact service quality for that particular service-session for the user and resource constraint for the network, specifically under heavy network load conditions and/or congestions.

Additionally, existing charging techniques (static or dynamic) may not provide for determination of charging rate commensurate with the delivered service quality. For example, service quality degradation or disruption may happen due to network faults or congestion, and/or due to overloading during the session. However, a user of a service-session may be overcharged in case of service interruptions or degraded service quality. Moreover, existing dynamic charging techniques are provided for a particular network (i.e., perform dynamic charging for intra-network sessions only), and may not perform dynamic charging across network segments. However, typically service end-points may span across multiple networks (different operators, different technologies, different geographies, etc.). In such a scenario, there may be no mechanism of dynamic determination of charging rate on the combined end-to-end network for the particular service-session. As a consequence, operator(s) catering such cross-network service-session may end up under or over charging for the delivered service quality.

In other words, existing techniques fail to provide appropriate amount proposed to be charged for the projected service consumption for a session spanning across multiple networks by taking into consideration desired service quality.

SUMMARY

In one embodiment, a method for dynamic charging in a communication network is disclosed. In one example, the method may include dynamically determining a charging rate for the communication session upon initiation of a communication session, based on at least one of an estimated quality of service and a dynamically determined inter-network charging rate for the communication session. The method may further include initiating charging for the communication session based on the charging rate. The method may further include monitoring at least an actual quality of service for the communication session with respect to the estimated quality of service for a duration of the communication session. The method may further include dynamically updating the charging rate based on the monitoring.

In one embodiment, a system for dynamic charging in a communication network is disclosed. In one example, the system may include a network device, which in turn may include at least one processor configured to execute a set of instructions for providing a rating module, and one of a session based charging module and an event based charging module. The rating module may dynamically determine a charging rate for the communication session upon initiation of a communication session, based on at least one of an estimated quality of service and a dynamically determined inter-network charging rate for the communication session. The session based charging module or the event based charging module may initiate charging for the communication session based on the charging rate, and may monitor at least an actual quality of service for the communication session with respect to the estimated quality of service for a duration of the communication session. The rating module may further dynamically update the charging rate based on the monitoring. The network device may further include at least one computer-readable medium that stores the set of instructions, configuration data, session data, estimation data, and threshold data.

In one embodiment, a non-transitory computer-readable medium storing computer-executable instructions for dynamic charging in a communication network is disclosed. In one example, the stored instructions, when executed by a processor, may cause the processor to perform operations comprising dynamically determining a charging rate for the communication session upon initiation of a communication session, based on at least one of an estimated quality of service and a dynamically determined inter-network charging rate for the communication session. The operations may further include initiating charging for the communication session based on the charging rate. The operations may further include monitoring at least an actual quality of service for the communication session with respect to the estimated quality of service for a duration of the communication session. The operations may further include dynamically updating the charging rate based on the monitoring.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
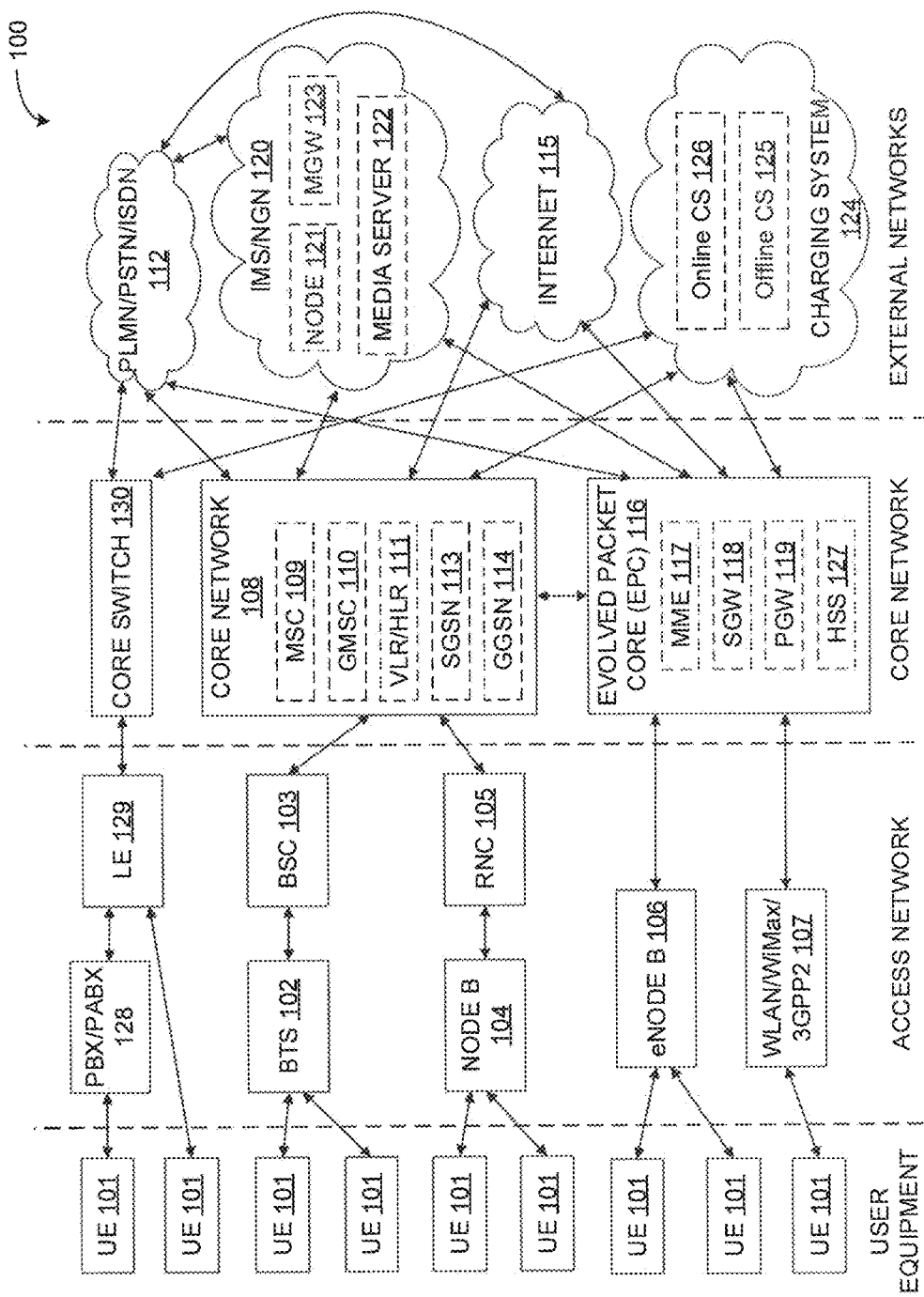
FIG. 1 illustrates an exemplary communication network architecture in which various embodiments of the present disclosure may function.

Referring now to FIG. 1, an exemplary communication network architecture in which various embodiments of the present disclosure may function is illustrated. The communication network 100 may include one or more user equipment (UE) 101 communicating wirelessly or over a tethered communication line (e.g., copper wires) with various access networks. Examples of a UE 101 may include but are not limited to a landline phone, a cell phone, a smart phone, a tablet, a phablet, and a laptop. The access network may include a wired legacy access networks or radio access networks. For, the purposes of illustration, the wired legacy access network may include a PSTN/ISDN access network. A private branch exchange (PBX) or a private automatic branch exchange (PABX) 128 and a local public exchange 129 may for the PSTN/ISDN access network. Further, for purpose of illustration, the various radio access networks may include, but are not limited to, a GSM EDGE radio access network (GERAN), a UMTS terrestrial radio access network (UTRAN), and an evolved UMTS terrestrial radio access network (E-UTRAN). A base transceiver station (BTS) 102 and a base station controller (BSC) 103 may form the GERAN, while a Node B 104 and a radio network controller (RNC) 105 may form the UTRAN. Similarly, evolved Node B (eNode B) 106 may form the E-UTRAN, and may act as the base station for E-UTRAN i.e., LTE network. However, the depicted radio access networks are merely exemplary, and thus it will be understood that the teachings of the disclosure contemplate other wired and wireless radio access networks such as worldwide interoperability for microwave access (WiMAX) network 107, wireless local area network (WLAN), code division multiple access (CDMA) network, High Speed Packet Access (3GPP's HSPA) network, 3GPP2 network 107, and so forth.

Each of the access networks may communication with a respective core network which in turn may communicate with external networks. The core network may include a core switch or a packet core which in turn may communicate with external circuit switched networks or packet switched networks. For example, in the illustrated embodiment, local exchange 129 may communicate with core switch (e.g., PSTN/tandem switch) 130, which in turn may communicate with a PSTN/ISDN/PLMN circuit switched network 112. As will be appreciated, the circuit switched network 112 may act as interexchange, thereby interconnecting other tandem switches. Further, for example, the GERAN and the UTRAN may communicate with a core network 108 comprising mobile services switching center (MSC) 109, gateway MSC (GMSC) 110, home location register or visitor location register (HLR/VLR) 111. The MSC 109 and GMSC 110 may serve the UE 101 in its current location for circuit switched services, and may be responsible for the interworking with external circuit switched networks 112. In some embodiments, the MSC 109 and GMSC 110 may also interwork with external packet switched networks, such as IP multimedia subsystem (IMS) network 120. For example, the MSC 109 may connect to a media gateway (MGW) 123 of the IMS network 120. The HLR/VLR 111 may be a mobile operator database accessible by MSC 109, and which may include information with respect to users such as phone number, location within home/visiting network, and so forth. The core network 108 may also include a packet core that includes serving GPRS support node (SGSN) 113 and gateway GPRS support node (GGSN) 114. As will be appreciated by those skilled in the art, general packet radio service (GPRS) may be a packet-oriented mobile data service that enables 2G and 3G cellular networks to transmit IP packets to external networks such as the Internet. The SGSN 113 may be a component of the GPRS network that handles functions related to packet switched data within the network such as packet routing and transfer, mobility management, charging data, authentication of the users, and so forth. Similarly, GGSN 114 may be another component of the GPRS network and is responsible for the interworking between the GPRS network and external packet switched networks, such as Internet 115 or IP multimedia subsystem (IMS) network 120.

Similarly, E-UTRAN may communicate with an evolved packet core (EPC) 116 that may include a mobility management entity (MME) 117, a serving gateway (SGW) 118, a packet data network (PDN) gateway (PGW) 119, and a Home Subscriber Server (HSS) 127. The MME 117 may be responsible for evolved packet system (EPS) session management (ESM), EPS mobility management (EMM), EPS connection management (ECM), ciphering and integrity Protection, inter core network signaling, system architecture evolution (SAE) bearer control, handover, and so forth. The combined functionalities of the SGW 118 and the PGW 119 may include lawful interception (LI), packet routing and forwarding, transport level packet marking in the uplink and the downlink, packet filtering, mobile IP, policy enforcement, and so forth. The POW 119 may further connect the EPC 116 with external packet switched networks such as the Internet 115 or next generation network (NON) 120. The HSS 127 may be a master user database containing user subscription related information such as user identification, user profile, and so forth. The HSS 127 may perform authentication and authorization of the user, and so forth.

The external networks may include the circuit switched network 112 such as public land mobile network (PLMN), public switched telephone network (PSTN), integrated service digital network (ISDN), and so forth. The external networks may also include Internet 115 and any other packet switched networks 120. Examples of the packet switched networks may include, but are not limited to, a next generation network (NGN), an IP multimedia subsystem (IMS) network, and so forth. The packet switched networks 120 may include a node 121 that anchors the session, and may be responsible for session management, routing and control. The node 121 may be a media gateway controller (MGC) in case of the NGN, or a serving-call session control function (S-CSCF) in case of the IMS networks. Additionally, the node 121 may be responsible for control and management of media servers 122. In some embodiments, the node 121 may invoke the services of a media resource broker (MRB) for selecting the appropriate media server 117, The packet switched networks 120 may further include a media gateway (MGW) 123 that may enable multimedia communications across packet-switched and circuit-switched networks by performing conversions between different transmissions and coding techniques. In some embodiments, the packet switched networks 120 may also include a signalling gateway (not shown in FIG. 1) that may be used for performing interworking between signalling protocols such as signalling system 7 (SS7) when connecting to PSTN/PLMN networks and IP-based signalling protocols such as SIGTRAN which is supported by the node 121. Such interface may allow for service such as voice over IP (VoIP) or IP phone. It should be noted that, in some embodiments, the packet switched networks 120 may also access and use the HSS 127.

The external networks may further include charging (i.e. billing) system 124. As will be appreciated, the charging system 124 may include an offline charging system 125 and an online charging system 126. In particular, the online charging system 126 may include one or more processors and one or more computer-readable medium (e.g., a memory) so as to implement various modules for effective dynamic charging in a wired, a wireless, a homogenous, or a heterogeneous communication network in accordance with aspects of the present disclosure. For example, the computer-readable medium may store instructions that, when executed by the one or more processors, may cause the one or more processors to dynamically determine a charging rate for an initiated communication session in real-time so as to perform effective dynamic charging for the initiated communication session commensurate with a delivered service quality.

Figure 2:
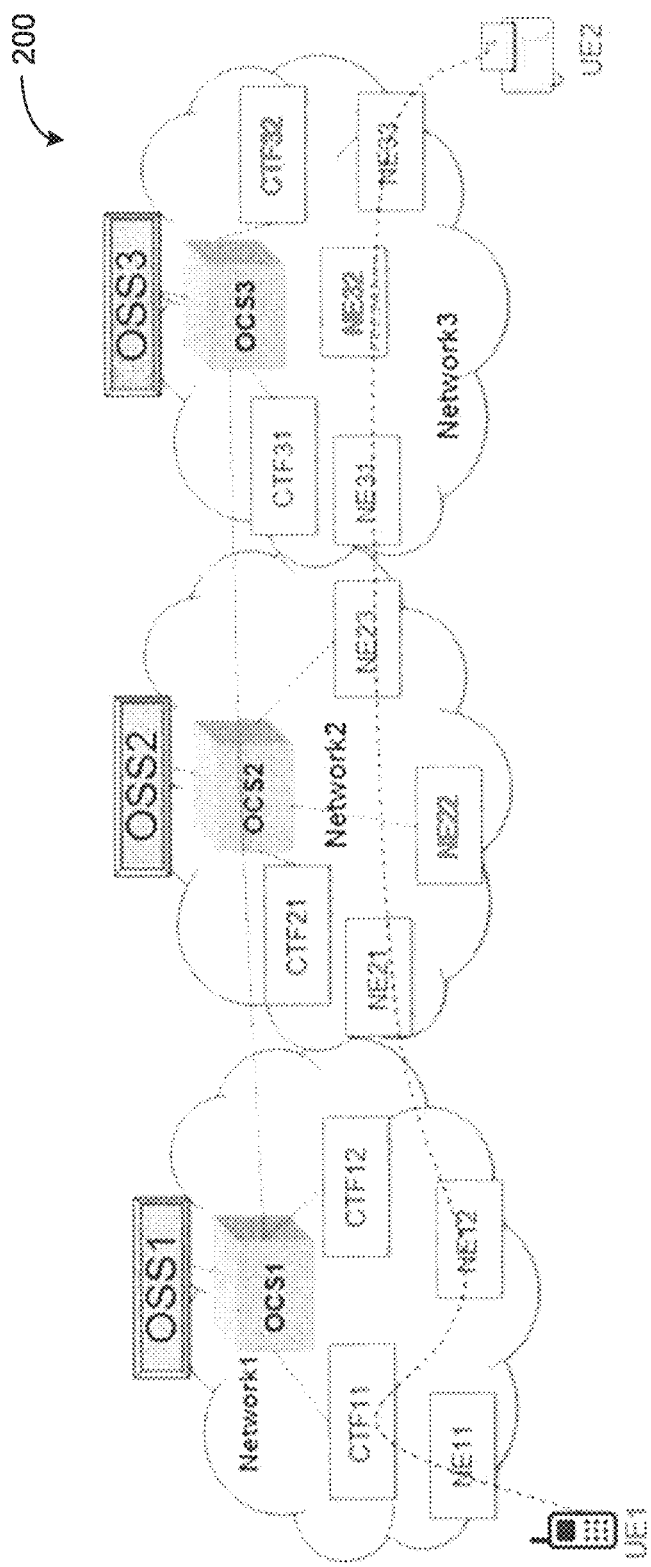
FIG. 2 illustrates an exemplary communication session spanning across multiple networks and involving various components of the network architecture.

Referring now to FIG. 2, an exemplary communication session spanning across multiple networks and involving various components of the network architecture is illustrated. The communication session (also referred to as service-session) between UE1 (used by user 1) and UE2 (used by user 2) may span across three networks (i.e., network1, network2, and network3). As will be appreciated, the service-session may be a particular service invoked (from an end-user perspective) during a session thereby constituting a part of session, or simply a session where there are no service-specific parts involved. For example, the service-session may include, but is not limited to, voice call, video call, browsing session, a skype call during a data session, etc. Further, as described above, each of the networks may include one or more communication technologies including, for example, a wired access and/or wireless access such as 3G/4G, a packet core, an aggregation segment, IMS, backbone, and so forth. It should be noted that only those components that are relevant to understanding of various embodiments of the present disclosure are illustrated for the sake of brevity. For example, the interfaces to the online charging system with the different components alone are shown, while the interconnections between the network elements (NE) and other components are not shown for clarity.

As illustrated, each of the three networks may have an online charging system (i.e., OCS1, OCS2, and OCS3), an operations support system (i.e., OSS1, OSS2, and OSS3), one or more charging trigger functions (i.e., CTF11 and CTF12 in network1, CTF21 in network2, and CTF31 and CTF32 in network3), and several network elements (NE11 and NE12 in network1, NE21, NE22, and NE23 in network2, and NE31, NE32, and NE33 in network3). It should be noted that, the CTFs are shown as being distinct from other NEs for clarity, however in practice, some of the NEs may also act as CTFs. Further, as illustrated, the OCS2 in network2 may interface directly with NEs (e.g., NE22 and NE23) so as to collect information about the network conditions, etc. Alternatively, as illustrated, in network1 and network3, the OCS1 and OCS3 may collect such information from the OSS1 and OSS3 respectively.

Figure 3:
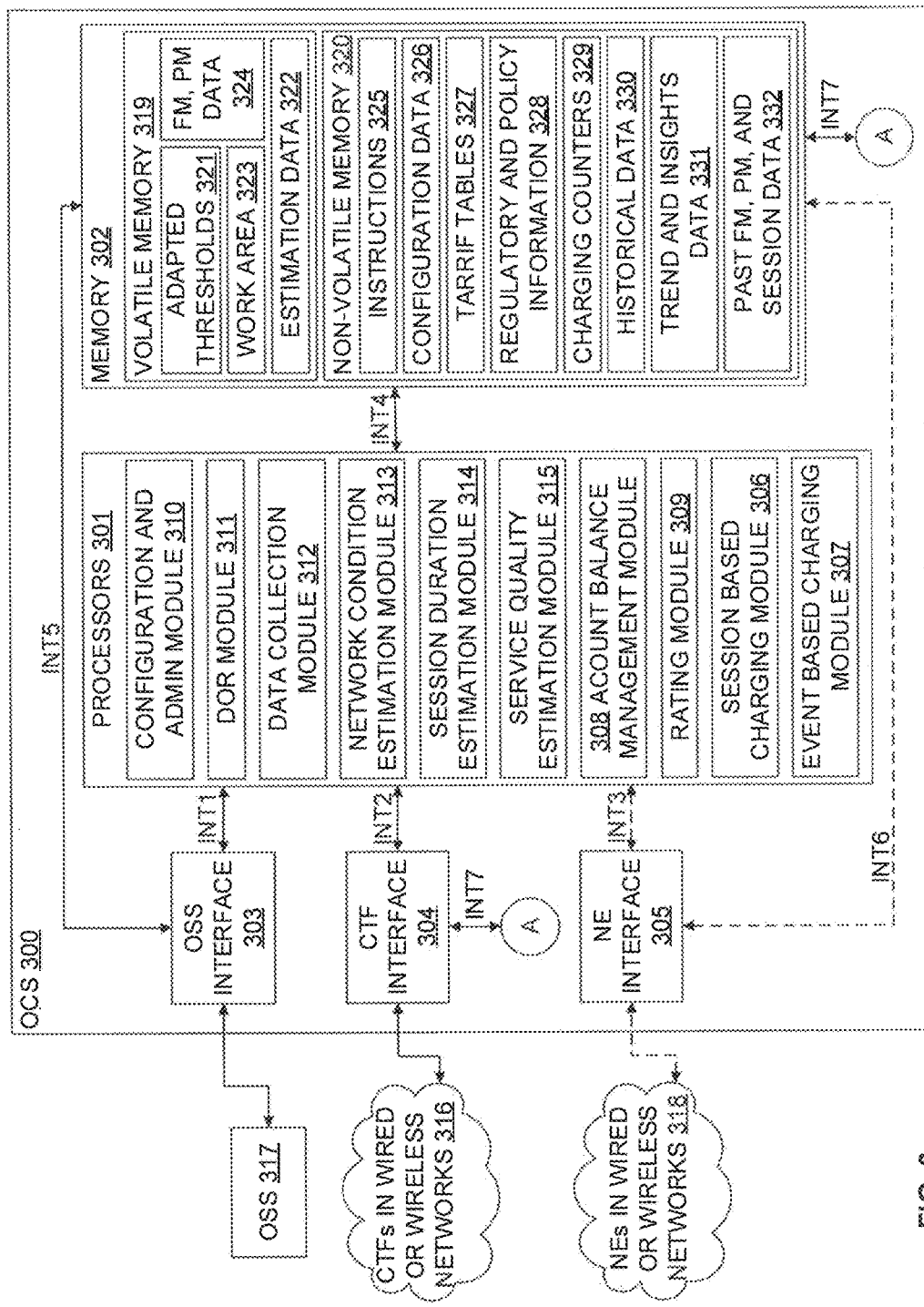
FIG. 3 is a functional block diagram of an exemplary online charging system (OCS) in the network architecture that performs dynamic charging in accordance with some embodiments of the present disclosure.

Referring now to FIG. 3, a functional block diagram of the online charging system (OCS) 300 analogous to the online charging system 126 implemented by the communication network 100 of FIG. 1 is illustrated in accordance with some embodiments of the present disclosure. As will be described in greater detail below, the OCS 300 may dynamically determine a charging rate for the communication session upon initiation of a communication session, based on at least one of an estimated quality of service and a dynamically determined inter-network charging rate for the communication session. Further, the OCS 300 may initiate charging for the communication session based on the charging rate, may monitor at least an actual quality of service for the communication session with respect to the estimated quality of service for a duration of the communication session, and may dynamically update the charging rate based on the monitoring.

As stated above, the OCS 300 may include one or more processors 301 for executing or hosting various modules that perform dynamic charging and other functions. The OCS 300 may further include one or more memory 302 for storing various instructions corresponding to various modules. The memory 302 may also store multiple system and network parameters received by the OCS 300 as well as other data as required by or as processed by various modules. The OCS may also include a number of interfaces such as operations support system (OSS) interface 303, charging trigger function (CTF) interface 304, network element (NE) interface 305, etc. for interfacing with rest of the network so as to send and receive various data and commands.

In some embodiments, various modules in the OCS 300 may include a session based charging module (SBCM) 306, an event based charging module (EBCM) 307, an account balance management module (ABMM) 308, a rating module (RATM) 309, a configuration and admin module (CADM) 310, a Division of Revenue (DOR) module (DORM) 311, a data collection module (DCM) 312, a network condition estimation module (NCEM) 313, a service-session duration estimation module (SSDEM) 314, and a service quality estimation module (SQEM) 315.

The SBCM 306 is typically responsible for session-based charging and credit-control functions. The SBCM 306 may interact with the charging trigger functions (CTFs) 316 via INT2 using the CTF interface 304. In addition to its existing functions, the SBCM 306 may pass information about the neighbouring network(s) involved in the session when triggering the RATM 309 to dynamically determine the charging rate for the session. Additionally, the SBCM 306 may monitor various parameters such as session duration, network conditions, service quality degradation, service disruption duration, etc. The SBCM 306 may then compare the monitored parameters against their corresponding thresholds so as to trigger the RATM 309 to determine the updated rating for the service-session. Further, the SBCM 306 may update the thresholds for various parameters at the end of each service-session based on the observations and learnings during the session, and may send updated thresholds to the memory 302. The updated thresholds may include, but are not limited to, ESTIM_SESS_DUR_THRESHOLD (threshold % for difference between actual session duration and estimated session duration), ESTIM_NTW_COND_THRESHOLD (threshold % for difference between actual network conditions and estimated network conditions), ESTIM_SERV_DISRUPT_DEGRAD_THRESHOLD (threshold % for difference between actual service quality degradation/disruption duration and estimated actual service quality degradation/disruption duration), and so forth.

The EBCM 307 is typically responsible for event-based charging and credit-control functions. The EBCM 306 may interact with the charging trigger functions (CTFs) 316 via INT2 using the CTF interface 304. In addition to its existing functions, the EBCM 306 may pass information about the neighbouring network(s) involved in the event when triggering the RATM 309 to dynamically determine the charging rate for the event. The ABMM 308 is typically responsible for functions such as checking account balance of the user, updating the account balance during or after the session, getting or setting charging-related counters, getting or setting expiry date of the (pre-paid) account of a user, etc.

In accordance with aspects of the present disclosure, the RATM 309 may perform dynamic rating (i.e., unit determination) for the service-session or event. Thus, upon trigger from the SBCM 306 or EBCM 307 to determine the rating for the session or event, the RATM 309 may fetch the most recently received estimation of future network conditions stored in the local database for the next 'n' intervals. It should be noted that 'n' is configurable, and a time interval is typically expressed in minutes (e.g., 5 minutes), However, if estimation of future network conditions is not available in the local database, the RATM 309 may trigger the NCEM 313 for providing an estimation of the future network conditions. Additionally, the RATM 309 may trigger the SSDEM 314 for an estimation of service-session duration. Further, the RATM 309 may trigger the SQEM 315 for an estimation of service quality. Moreover, the RATM 309 may trigger the DORM 311 to provide inputs so as to finalize the subscriber charging rate. The RATM 309 may then dynamically determine the charging rate for the service-session or the event based on inputs from different estimation modules, and SBCM 306 (for session-based charging) or EBCM 307 (for event-based charging). The RATM 309 may then pass the determined subscriber rate of charging to the DORM 311, obtain the updated charging rate from DORM 311 based on updated inter-network charging rate, and pass it to the applicable CTFs for the session or the event.

The RATM 309 may also store all rating related information collected or determined during the service-session or the event. The RATM 309 may further update the thresholds and parameters at the end of each service-session based on the accuracy of charging rate determined, observations, and learnings during the session, and may update the memory 302 accordingly. The updated thresholds and parameters may include, but are not limited to, Service-session duration tuning factor (SSDTF), network conditions tuning factor (NCTF), service quality degradation or disruption tuning factor (SQDTF), and so forth.

The CADM 310 is typically responsible for configuration and administration of various modules in the OCS 300 based on configuration data. In addition to its existing functions, the CADM 310 may obtain inputs from the OSS 317 or operator regarding the policies for dynamic charging, and inter-network charging rate. The CADM 310 may then pass relevant information to the RATM 309 and the DORM 311. Further, the CADM 310 may obtain provisioned inputs from the operator on thresholds and parameter values to be used for dynamic charging. The CADM 310 may then pass the information to the RATM 309. It should be noted that the provisioned inputs may include various parameter values, policies, thresholds, look up tables, and so forth.

In accordance with aspects of the present disclosure, the DORM 311, in the originating network (i.e., the network that initiated the call), may receive the subscriber charging rate from the RATM 309. The DORM 311, in the originating network, may then trigger the DORM 311 in the succeeding network (if present) involved in the service-session (by sending a DORM_REQUEST message) to provide the adapted inter-network charging rate. The DORM_REQUEST message contents may include, but are not limited to, estimated session duration, session type, session requirements, and so forth. It should be noted that these inputs are obtained from the RATM 309 in case of originating network, or from the DORM_REQUEST message received from the preceding network in case of all other networks involved in the service-session. The DORM 311 may then determine the inter-network charging rate based on the response (DORM_RSP) received from the succeeding network, estimated network conditions, and estimated service quality degradation or disruption in its own network. Further, the DORM 311 may adapt the subscriber charging rate (in the originating network) based on the received (updated) inter-network charging rate. The determination of the inter-network charging rate and the adapted subscriber charging rate will be described in greater detail below with respect to FIG.

5. The DORM 311 may then pass the adapted subscriber charging rate to the RATM 309 (in the originating network).

Additionally, the DORM 311 may pass the determined inter-network charging rate to the preceding network (except if the network is an originating network). Further, the DORM 311 may start a timer (DORM_RSP_TIMER) to wait for the DORM_RSP message from the succeeding network (except in case of terminating network involved in the service-session), and upon expiry of the timer, in case DORM_RSP was not received, may determine the inter-network charging rate based on historical data, estimated network conditions, and estimated service quality degradation or disruption in its own network. It should be noted that the value of the DORM_RSP_TIMER in the originating network is typically a value which ensures that the overall session setup is not delayed, e.g., by more than 10%. Moreover, the DORM 311 may adapt parameters such as current DOR scaling factor (CURR_DOR_SCF) and inter-network charging factor (INC_FACTOR) based on historical data and observations or information collected during the current service-session. It should be noted that current DOR scaling factor (CURR_DOR_SCF) and inter-network charging factor (INC_FACTOR) are factors that are initially provisioned by the operator and adapted thereafter.

As will be appreciated, in current or existing networks, DORM may be a part of the business support system (BSS) or charging system (CS) as the division of revenue (DOR) determination is typically not done in real-time. However, due to the dynamic determination of charging rate, it becomes essential to determine DOR dynamically and to share the determined DOR information in real-time to the preceding networks in order to arrive at accurate charging tariff for the end-user. Thus, in accordance with aspects of the present disclosure, the DORM may be a part of the OCS 300.

In accordance with aspects of the present disclosure, the DCM 312 may be responsible for collecting the data required for the various estimation modules such as NCEM 313, SSDEM 314, and SQEM 315, and for converting it into the format that is required by the different modules in the OCS 300. The format conversion may include converting it into the same (i.e., common) unit, converting it into binary, rounding off, etc. The DCM 312 may collect the required data including, but not limited to, performance management (PM) data of the various NEs (e.g., resource occupancy levels, network congestion levels, etc.), fault management (FM) data (e.g., alarms, alerts) of the various NEs, service-session duration information, and so forth. The DCM 312 may typically collect the data from the OSS 317 via OSS interface 303 (INT1). However, in some embodiments, the DCM 312 may collect some information directly from the NEs 318 via NE interface 305 (INT3). The NEs 318 from which the DCM 312 may collect data directly may include access network components (e.g., eNodeB, etc.), packet core components (e.g., SGW, PGW, etc.), IMS core network components (e.g., S-CSCF, MGW, MRF, etc.), and so forth. The DCM 312 may collect the data from the OSS 317 or from relevant NEs 318 using standard interfaces such as REST, X.25, etc., or proprietary interfaces such as proprietary interfaces running on TCP/IP. Further, the DCM 312 may store the collected data in the volatile memory as well as in non-volatile memory. In the non-volatile memory, the data may be stored in duster databases to ensure availability and scalability.

In accordance with aspects of the present disclosure, the NCEM 313 may estimate the network conditions for future 'n' intervals based on historic data on network conditions, current resource occupancy levels and congestion indications received. The NCEM 313 may estimate the network conditions periodically or upon trigger from the RATM 309. Additionally, in accordance with aspects of the present disclosure, the SSDEM 314 may estimate the service-session duration based on historical data of same or similar service-sessions involving the same user, inputs from NCEM 313 about the network conditions, and parameters such as user location, account balance, time of day, etc.

Further, in accordance with aspects of the present disclosure, the SQEM 315 may obtain estimated network condition information from NCEM 313, and estimated service-session duration information from SSDEM 314. The SQEM 315 may further obtain session characteristics and key performance indicator (KPI) requirements from the SBCM 306, or event characteristics and KPI requirements from the EBCM 307. The SQEM 315 may then handle request from RATM 309 to estimate service quality degradation or disruption duration for the given service-session. The SQEM 315 may estimate outage (network or service) based on historical PM/FM trends, current resource occupancy and congestion levels, and their trends as described in greater detail in FIG. 5. Further, the SQEM 315 may estimate the service quality degradation or disruption duration for the given service-session for future 'n' intervals or for the estimated service-session duration (whichever is the least) based on estimated network conditions and estimated outages, taking into consideration the service-session characteristics (bandwidth required, throughput, transport protocol used, etc.) and KPI requirements for the service-session (allowed packet latency, jitter, packet loss, bit error rate (BER), minimum guaranteed throughput, etc.).

As will be appreciated, some or all of the modules 306-315 may be co-located on the same processor 301, however, typically, only some of the modules may be co-located on the same processor 301. Further, some of the processors 301 may have special characteristic features. For example, modules such as DCM 312 may run on processors 301 capable of receiving and processing a large volume of data coming from a network interface, Though the processing may be simple, the same needs to be performed on a large volume of data in near-real-time. Additionally, for example, estimation modules such as NCEM 313, SSDEM 314, and SQEM 315 may run on processors capable of doing complex (and parallel) processing on large amount of data. Such modules may therefore be hosted on special processors equipped with capabilities such as transactional synchronization extensions, database acceleration engines, stream processing engines, special digital signal processing (DSP) components, etc. Further, for example, modules such as SBCM 306 and EBCM 307 may have to perform a lot of processing and timer handling for continuous monitoring of the session. To enable this, such modules may have to be hosted on high-end processors with special co-processors for timer-handling, etc.

The OCS memory 302 may include volatile memory 319 and non-volatile memory 320. Some parts of the memory may be monolithic (e.g., memory for adapted thresholds, configuration data, etc.), while others may include a (scalable) cluster (e.g., memory for FM data, PM data, etc.) so as to cater to large volume of data and to scale up or down as required while ensuring high-availability. Further, for data such as FM data, PM data, etc. in-memory database mechanisms may be employed to accelerate data access.

The volatile memory 319 may include data such as adapted thresholds 321 (adapted values of various thresholds as described in present disclosure), estimation data 322 (data on estimated network conditions, estimated service quality degradation or disruption, service-session duration, outage, etc.), work area 323 (information required for the handling and maintenance of the service-session including counters, service characteristics, ongoing service-sessions, active timers, etc.), and FM/PM Data 324.

Further, the non-volatile memory 320 may include instructions 325 (instructions corresponding to various modules that may be loaded in the processors 301 for execution), configuration data 326 (all configuration data including thresholds, configuration parameter values, look-up tables, etc.), tariff tables 327 (provisioned values of tariff tables, including inter-network charging tables), regulatory and policy information 328 (regulatory and policy data such as calls that should not be charged, upper limit of tariffs, etc.), charging counters 329 (used for rating and account balance management), historical data 330 (all relevant historical data including those used in various estimations and threshold adaptations described in present disclosure), trends and insights data 331 (trends and correlation insights that have been determined by the estimation modules for quick reference during various estimations and correlation analysis), and past FM, PM, and session data 332 (all relevant past data of network conditions, congestion indications, service quality degradation/disruption, outages, alarms, session characteristics and duration along with timestamp, etc.).

The OSS interface 303 may interface the OSS 317 and the OCS 300. Typically, the OSS interface 303 may be a wired interface employing protocols such as IP, X.25, etc., and security mechanisms such as IPsec or TLS. In some embodiments, proprietary protocols may also be employed on the OSS interface 303 especially if the OCS 300 and the OSS 317 may be provided by the same equipment vendor. In accordance with aspects of the present disclosure, the OSS interface 303 may further obtain provisioning inputs related to inter-network charging rates, subscriber charging tariffs, etc. Additionally, in accordance with aspects of the present disclosure, the OSS interface 303 may obtain performance and fault data of NEs (e.g., resource occupancy levels, KPI information, alarms, congestion notification, etc.) either periodically, or upon occurrence of an event. As illustrated, INT1 and INT5 may be internal connections (interfaces) to enable connection to the OSS 317 via the OSS interface 303 from the processors 301 and the memory 302. As will be appreciated, they may be physical wired or wireless interfaces, or a virtual interface in case the entire OCS in virtualized.

The CTF interface 304 may interface the CTFs 316 in different network segments (e.g., wired access network, wireless access network (2G/3G/4G), packet core, IMS, etc.) of the network operator and the OCS 300. Typically, the CTF interface 304 may be a standard interface, and usually a wired interface using circuit-switched connections such as E1 or T1, or packet-switched protocols such as IP. The CTF interface 304 may be employed by the CTFs 316 to trigger the OCS 300 upon session initiation/modification/termination, running out of credits, etc., and by the OCS 300 to inform the CTFs 316 about the credits, tariff, etc. In accordance with aspects of the present disclosure, the CTF interface 304 may further collect performance and any other measurements data directly from the CTFs 316 in case the information is not available (in time) with the OCS 300, and the OCS 300 to send modifications to the charging rate due to network conditions, etc. Again, as illustrated, INT2 and INT7 may be internal connections (interfaces) to enable connection to the CTFs 316 via the CTF interface 304 from the processors 301 and the memory 302. As will be appreciated, they may be physical wired or wireless interfaces, or a virtual interface in case the entire OCS in virtualized.

In accordance with aspects of the present disclosure, the NE interface 305 may interface NEs 318 in the wired/wireless access as well as core networks other than the CTFs and the OCS 300. As stated above, the NE interface 305 may be optional and may be primarily employed to collect FM and PM data directly from the NEs 318 in case such information is not available (in time) from the OSS 317. Yet again, as illustrated, INT3 and INT6 may be internal connections (interfaces) to enable connection to the NEs 318 (other than the CTFs) via the NE interface 305 from the processor 301 and the memory 302. As will be appreciated, they may be physical wired or wireless interfaces, or a virtual interface in case the entire OCS in virtualized.

Apart from the above, INT4 may be an internal interface between the processors 301 and the memory blocks 302. This interface may be a physical wired interface, and it may also employ some acceleration techniques such as using a high speed switching fabric to increase the speed of data communication between the memory 302 and the processors 301. In some embodiments, INT4 may also be a logical interface on a communication bus on the same hardware when a processor 301 and the associated memory 302 are co-located on the same hardware board.

It should be noted that the OCS 300 may be implemented in programmable hardware devices such as programmable gate arrays, programmable array logic, programmable logic devices, and so forth. Alternatively, as stated above, the OCS 300 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices.

As will be appreciated by one skilled in the art, a variety of processes may be employed for dynamic charging of service-session carried over multiple different types of communication network. For example, the exemplary communication network 100 and the associated OCS 300 may facilitate dynamic charging during of a communication sessions by the processes discussed herein. In particular, as will be appreciated by those of ordinary skill in the art, control logic and/or automated routines for performing the techniques and steps described herein may be implemented by components of the communication network 100 (e.g., the charging system 124 via the associated OCS 300 and the CTF), either by hardware, software, or combinations of hardware and software. For example, suitable code may be accessed and executed by the one or more processors on the OCS 300 to perform some or all of the techniques described herein. Similarly, application specific integrated circuits (ASICs) configured to perform some or all of the processes described herein may be included in the one or more processors on the OCS 300. Additionally, it should be noted that though the process described below may focus on session-based charging, the process may also be equally applicable to event-based charging and may follow substantially similar principles with appropriate modifications and with the EBCM 307 performing the actions instead of the SBCM 306.

Figure 4:
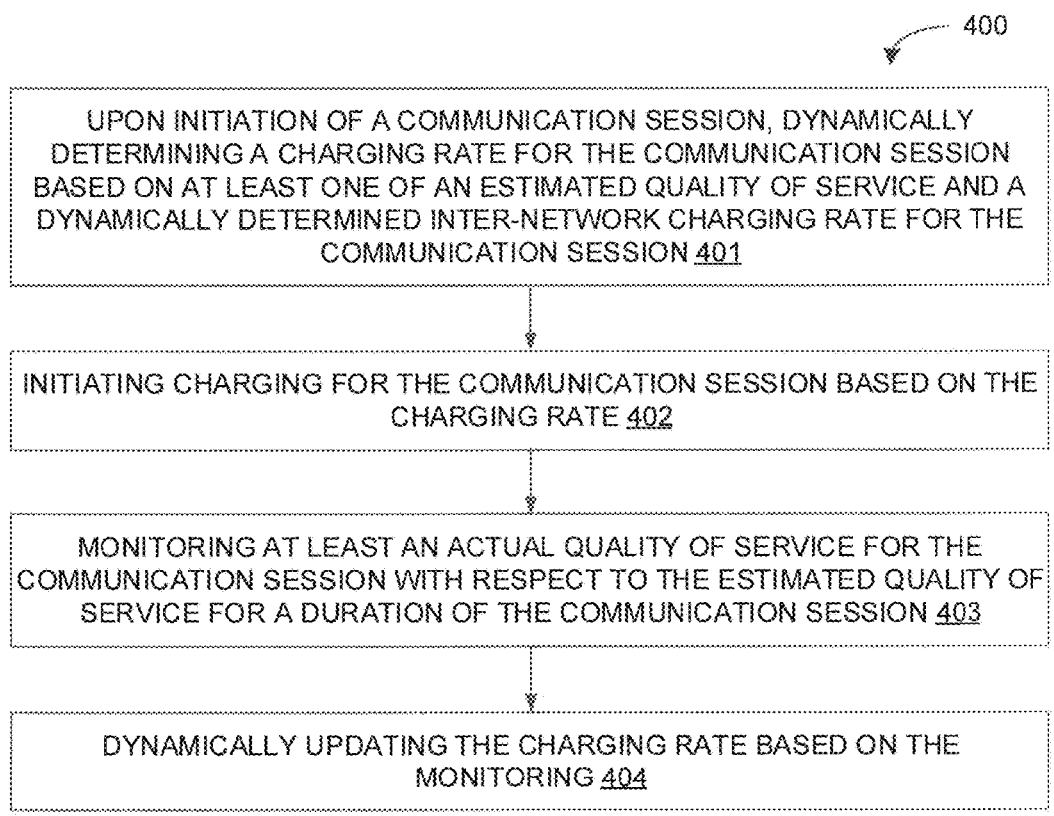
FIG. 4 is a flow diagram of an exemplary process for dynamic charging in a communication network in accordance with some embodiments of the present disclosure.

For example, referring now to FIG. 4, exemplary control logic 400 for performing effective dynamic charging in a communication network 100 via a system, such as the OCS 300, is depicted via a flowchart in accordance with some embodiments of the present disclosure. As illustrated in the flowchart, the control logic 400 may include the step of dynamically determining a charging rate for the communication session upon initiation of a communication session, based on at least one of an estimated quality of service and a dynamically determined inter-network charging rate for the communication session at step 401. The control logic 400 may further include the steps of initiating charging for the communication session based on the charging rate at step 402, monitoring at least an actual quality of service for the communication session with respect to the estimated quality of service for a duration of the communication session at step 403, and dynamically updating the charging rate based on the monitoring at step 404. In some embodiments, the control logic 400 may further include the steps of initiating a learning process upon termination of the communication session, and updating, based on the learning process, at least one of historical data with information about the communication session, a plurality of pre-provisioned threshold values for dynamic update of the charging rate, a base charging rate, and the inter-network charging rate for the communication session.

In some embodiments, dynamically determining the charging rate at step 401 may include the steps of determining an estimated network condition for each of a plurality of network segments involved in the communication session, and determining an estimated duration of the communication session. Additionally, in some embodiments, determining the estimated network condition for a network segment may include the steps of accessing historical data and current data with respect to at least resource occupancy levels and congestion indications for the network segment, and determining the estimated network condition for the network segment based on the historical data and the current data using a predictive model. Similarly, in some embodiments, determining the estimated duration of the communication session may include the steps of accessing historical data and current data with respect to at least one of a user characteristic, a session characteristic, and an event characteristic for the communication session, determining an initial estimated duration of the communication session based on the historical data and the current data using a predictive model, and determining the estimated duration of the communication session based on the initial estimated duration and the estimated network condition for at least one of the plurality of network segment. It should be noted that, in some embodiments, the at least one of the plurality of network segments may be a network segment where charging is taking place. Additionally, it should be noted that, the user characteristic may include, but is not limited to, an identification of a user participating in the ongoing communication session, a policy with respect to the user, a location of the user, a mobility of the user, a past behavior of the user, and so forth. Further, it should be noted that the session characteristic may include, but is not limited to, a type of the session, a time of the session, a codec employed in the session, a policy with respect to the session, a service invoked during the session, a bandwidth consumed during the session, and so forth. Similarly, it should be noted that the event characteristic may include, but is not limited to, a type of the event, a time of the event, a policy with respect to the event, a bandwidth consumed during the session, and so forth.

In some embodiments, dynamically determining the charging rate at step 401 may further include the steps of determining the estimated quality of service, and dynamically determining the inter-network charging rate for the communication session. Additionally, in some embodiments, determining the estimated quality of service may include the steps of accessing historical data with respect to at least one of network outages, a network condition, and a quality of service for at least one of the plurality of network segment, accessing the historical data and current data with respect to at least one of a session characteristic and an event characteristic for the communication session, determining an estimated network outages for the estimated duration of the communication session and the estimated network condition for at least one of the plurality of network segment based on the historical data using a predictive model, and determining the estimated quality of service for the estimated duration of the communication session, the estimated network condition, and the estimated network outages for at least one of the plurality of network segment based on the historical data and the current data using a predictive model. Similarly, in some embodiments, dynamically determining the inter-network charging rate may include the steps of determining an initial inter-network charging rate at a destination network segment for the estimated duration based on at least one of allocated resources, the estimated quality of service, and the estimated network condition at the destination network segment, determining a subsequent inter-network charging rate at a preceding network segment based on at least one of allocated resources, the estimated quality of service, the estimated network condition at the preceding network segment, the initial inter-network charging rate, and a factor proportional to a difference between the inter-network charging rate received from the destination network segment and the provisioned inter-network charging rate of the destination network segment, and iterating determination of the subsequent inter-network charging rate for each of the plurality of preceding network segments till a source network segment. It should be noted that, in some embodiments, the source network segment may be a network segment where the communication session is originating, while the destination network segment may be a network segment where the communication session is terminating. In some embodiments, where reverse charging is applied (i.e., when the called user is charged for the service session, as opposed to the calling user being charged), the roles of originating network segment and destination network segment would be reversed from an inter-network charging rate determination and subscriber charging rate determination perspective, and the iterative determination of the subsequent inter-network charging rate would be done in the reverse order (i.e., it would be done by each of the plurality of succeeding network segments till the destination network segment).

In some embodiments, dynamically determining the charging rate for the communication session at step 401 is further based on at least one of a base charging rate, and an estimated network condition for each of a plurality of network segments involved in the communication session. Additionally, in some embodiments, dynamically determining the charging rate for the communication session at step 401 includes the steps of determining a base charging rate based on at least one of a user characteristic, a session characteristic, allocated resources for the communication session, and a quality of service required for the communication session, and adjusting the base charging rate based on at least one of the estimated quality of service and the dynamically determined inter-network charging rate for an estimated duration of the communication session, and further based on an estimated network condition for each of a plurality of network segments involved in the communication session for the estimated duration of the communication session.

In some embodiments, dynamically updating the charging rate at step 404 includes the step of dynamically determining a new charging rate for at least a part of an estimated duration of the communication session upon breaching a pre-provisioned threshold value for a difference between the actual quality of service and the estimated quality of service. Additionally, in some embodiments, monitoring at step 403 further includes monitoring at least one of an actual network condition with respect to an estimated network condition for each of a plurality of network segments involved in the communication session, an actual duration with respect to an estimated duration of the communication session, a session characteristic, a user characteristics, and an event characteristic. Further, in some embodiments, dynamically updating the charging rate at step 404 includes the step of dynamically determining a new charging rate for at least a part of an estimated duration of the communication session upon breaching a pre-provisioned threshold value for at least one of a difference between the actual network condition and the estimated network condition, a difference between the actual duration and the estimated duration of the communication session, a change in the session characteristic, a change in the user characteristic, and a change in the event characteristic.

Figure 5:
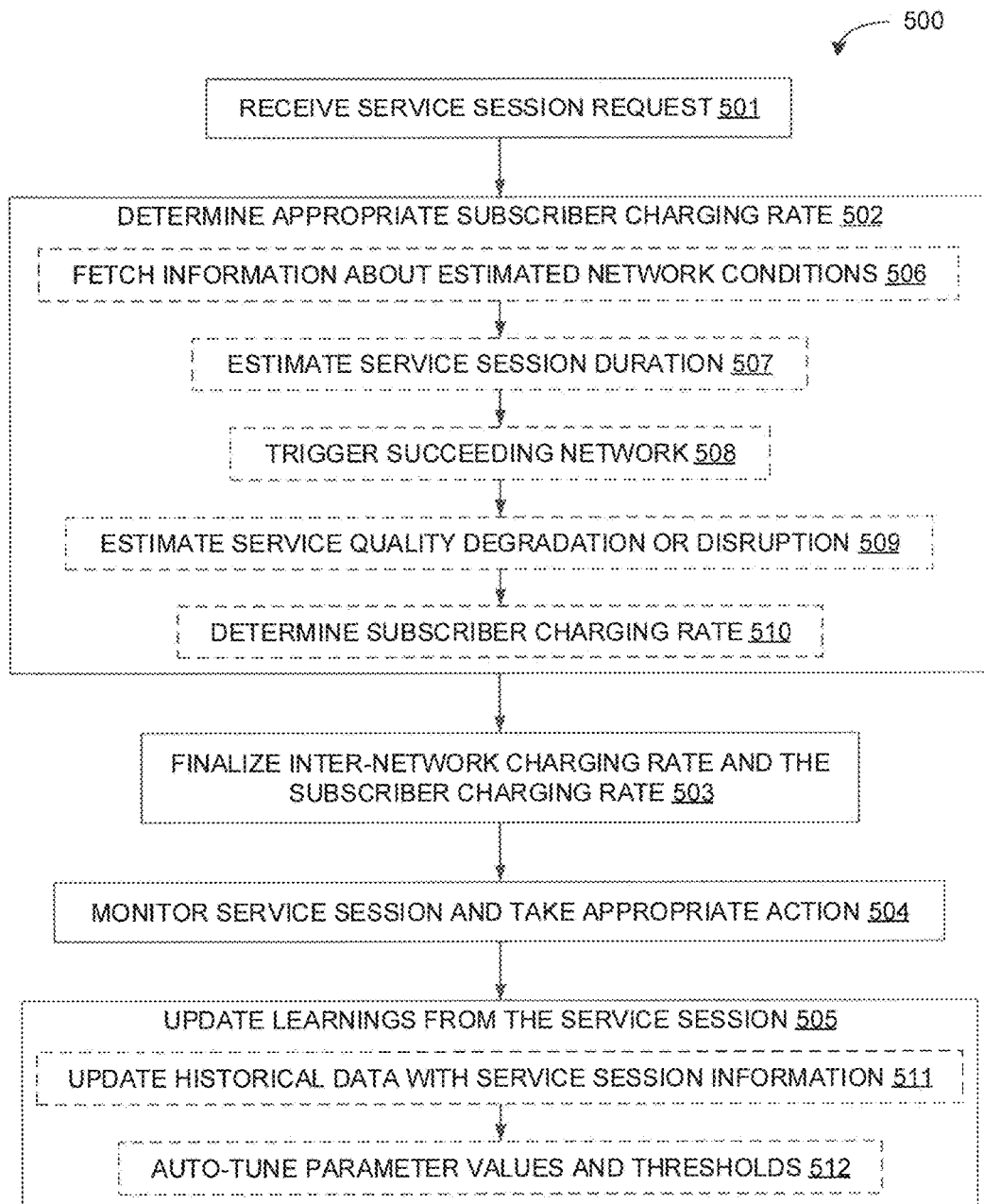
FIG. 5 is a flow diagram of a detailed exemplary process for dynamic charging in a communication network in accordance with some embodiments of the present disclosure.

Referring now to FIG. 5, exemplary control logic 500 for performing effective dynamic charging in a communication network 100 is depicted in greater detail via a flowchart in accordance with some embodiments of the present disclosure. As illustrated in the flowchart, the control logic 500 may include the steps of receiving service-session request at step 501, determining appropriate subscriber charging rate at step 502, finalizing inter-network charging rate and subscriber charging rate at step 503, monitoring session and taking appropriate action at step 504, and updating learning from the service-session at step 505. Each of these steps will be described in greater detail herein below. It should be noted that the exemplary control logic 500 is described mainly with respect to session-based charging. However, as will be appreciated by those skilled in the art, the exemplary control logic 500 may be equally applicable to event-based charging and may follow substantially similar logic with appropriate modifications. For example, for the event-based charging the EBCM 307 may perform the actions performed by the SBCM 306 for the session-based charging as indicated below. Additionally, it should be noted that the exemplary control logic 500 is described mainly with respect to online charging. However, as will be appreciated by those skilled in the art, the exemplary control logic 500 may be equally applicable to offline charging and may follow substantially similar logic with appropriate modifications. Further, it should be noted that the exemplary control logic 500 is described mainly with respect to an inter-network session, i.e., a session between 2 end-points or users spanning more than 1 network. In case of a session involving only one network, the logic described for determining inter-network charging rate shall not be applicable, and no actions will be performed by DORM 311. Moreover, it should be noted that, unless explicitly stated otherwise, the OCS 300 mentioned in the description below may be the OCS 300 present in the originating network (i.e., the network that initiated the call).

In some embodiments, at step 501, a UE 101 may send a request to the communication network for initiating a service-session involving online charging. Depending on the access network type and session type, the relevant CTF may send an appropriate trigger to the SBCM 306 to request for authorization and relevant charging information. Examples of various CTFs may be provided in a table below:

| Access type | Nature of session | CTF |
| --- | --- | --- |
| Don't care | IMS (controlled session) | S-CSCF |
| LTE | Don't care | PGW |
| 3G | Voice | MSC |
| 3G | Data | SGSN/GGSN |
| Don't care | LIPA | L-PGW |
| Don't care | SIPTO | SIPTO GW |
| Wi-Fi | Don't care | Wi-Fi AP |

The SBCM 306 may trigger the ABMM 308 to determine the available remaining credits for the user. The ABMM 308 may provide the requested information (e.g., in the form of counters) along with the indication whether the user has sufficient minimum remaining credits as provisioned by the operator (which could even be '0'). If the ABMM 308 informs the SBCM 306 that the user has sufficient minimum remaining credits, then the SBCM 306 may trigger the RATM 309 to determine the rating for the session. The SBCM 306 may pass relevant information to the RATM 309. The relevant information may include information such as identity of the users involved in the session, session characteristics, resource requirements, session KPI requirements (obtained from subscriber profile and/or based on session characteristics), any policy or regulatory constraints, network segments, information on whether the session is within the same operator's network or involving a network belonging to another operator (in which case, the identity of the neighboring network), etc.

In some embodiments, determining appropriate subscriber charging rate at step 502 further includes fetching information about estimated network conditions during the service-session at step 506, estimating service-session duration at step 507, triggering a succeeding network segment at step 508, estimating service quality degradation or disruption at step 509, and determining the subscriber charging rate at step 510.

At step 506, the RATM 309 may obtain the details of the most recently estimated network conditions (for the next 'n' intervals) from the local memory or from the NCEM 313. Based on the information about the network segments involved in the session, the RATM 309 may fetch the most recent estimates of the network conditions for the next 'n' intervals, if available, from the estimation data portion of the local volatile memory (which in turn may receive the estimates from the NCEM 313 periodically). However, in case the information is not available, then the RATM 309 may directly send a request to the NCEM 313 for obtaining the requested information. The NCEM 313 may then provide the requested information after estimating the network conditions using an appropriate logic in accordance with aspects of the present disclosure. In some embodiments, the NCEM 313 may estimate the network conditions as follows:

(a) For each network segment, the NCEM 313 may fetch historical data and current data of the resource occupancy levels and congestion indications from the non-volatile memory of the OCS 300.

(b) Based on the historical data samples and the current data samples, the NCEM 313 may apply an appropriate predictive models such as linear time series models (e.g., auto regressive integrated moving average (ARIMA), auto regressive fractionally integrated moving average (ARFIMA), etc.), or non-linear time series models (e.g., autoregressive exogenous models, generalized autoregressive conditional heteroscedasticity (LARCH), etc.) so as to determine the network conditions for the network segment for the next 'n' time intervals.

At step 507, the RATM 309 may trigger the SSDEM 314 to estimate the service-session duration by passing relevant details of the session such as the user characteristics (e.g., parties involved in the session, location of the served user, mobility of the served user etc.), session characteristics (e.g., session type (e.g., voice, video, etc.), time of session, etc.), and so forth. The SSDEM 314 may then estimate the service-session duration based on historical data and current data, estimated network conditions, etc. using an appropriate logic in accordance with aspects of the present disclosure. The SSDEM 314 may further send details of estimated service-session duration (ESSD) to the RATM 309. In some embodiments, the SSDEM 314 may estimate the service-session duration by estimating a raw service-session duration, adapting the raw service-session duration based on the estimated network conditions, and adjusting the determined service-session duration based on a tuning factor.

The SSDEM 314 may estimate the raw service-session duration as follows:
(a) The SSDEM 314 may determine a correlation between the service-session duration, and parameters such as time of day, type of session, location of the served user, the remote party involved in the session, mobility of the served user, etc. using predictive models such as linear regression, quantile regression, etc.
(b) Based on the correlation outcome, the SSDEM 314 may apply appropriate weighting factors, and may take the average of the last 'n' service-sessions involving the served user to determine the service-session duration for the current service-session.

It should be noted that, in case of sessions where the total amount of data to be transferred is known (e.g., as in case of a file download), the SSDEM 314 may perform a simple computation to estimate the raw service-session duration. For example, the raw service-session duration may be estimated as per equation (1) below:

raw service-session duration=total amount of data to be transferred/throughput            Equation (1)

The SSDEM 314 may then adapt the raw service-session duration based on the estimated network conditions, using pre-provisioned scaling factors. It should be noted that, in some embodiments, the network conditions of the network segment where charging is taking place may be taken into consideration. Examples of pre-provisioned scaling factors may be provided in a table below:

| Estimated Average Network Resource Occupancy Level | Scaling Factor |
|---|---|
| <50% | 1 |
| 50-70% | 1.1 |
| 70-85% | 1.2 |
| >85% | 1.4 |

Alternatively, the SSDEM 314 may adapt the raw service-session duration using more complex process. For example, in some embodiments, the SSDEM 314 may adapt the raw service-session duration as follows:
(a) The SSDEM 314 may determine correlation between network conditions and increase in service-session duration, for pre-determined session duration cases (e.g., in case of a file download) using models such as linear regression.
(b) The SSDEM 314 may then scale up the service-session duration appropriately based on the correlation.

The SSDEM 314 may then adjust the adapted or determined service-session duration using the tuning factor (SS-DTF).

At step 508, in case of an inter-network call, the RATM 309 may pass the information of the session (session characteristics, KPI requirements, networks involved in the session, etc.) along with the ESSD information to the DORM 311. The RATM 309 may then continue performing process described in step 509 below. The DORM 311 may then send a request (DORM_REQUEST) to the DORM in the succeeding network for information on the division of revenue (DOR). As stated above, the DORM_REQUEST may include estimated session duration, service characteristics and KPI information, network segments involved in the call (network id), and so forth. The DORM 311 may then start a timer DORM_RSP_TIMER for receiving the response from the succeeding network to the DORM_REQUEST. The process performed by DORM in each of the succeeding networks (involved in the service-session) is described in greater detail at step 503 below.

At step 509, the RATM 309 may trigger the SQEM 315 to estimate periods of service degradation or disruption during the service-session by passing relevant details of the session such as the user characteristics (e.g., parties involved in the session, location of the served user, mobility of the served user etc.), session characteristics (e.g., session type (e.g., voice, video, etc.), KPIs or quality of service (QoS) parameters associated with the service-session, estimated duration, etc.), and so forth. The SQEM 315 may then estimate the periods of service degradation or disruption during the service-session taking into consideration estimated network conditions, estimated service-session duration and other relevant parameters using an appropriate logic in accordance with aspects of the present disclosure. The SQEM 315 may further send details of estimated service degradation or disruption during the service-session to the RATM 309. In some embodiments, the SQEM 315 may estimate the service quality degradation/disruption as follows:
(a) The SQEM 315 may determine NE or network outages for estimated service-session duration based on estimated network conditions using models such as linear regression, and/or based on time series models considering past NE or network outages.
(b) The SQEM 315 may then determine correlation between network conditions, NE or network outages, and service quality degradation or service disruption by taking into consideration session characteristics. The correlation is determined using models such as linear regression on the historical data.
(c) Based on the correlation determined above, the SQEM 315 may then determine the service quality degradation or disruption during the estimated service-session based on estimated network conditions and estimated NE or network outages.

At step 510, the RATM 309 may determine the appropriate subscriber charging rate, using an appropriate logic in accordance with aspects of the present disclosure, by taking into consideration the estimated network conditions and the estimated service degradation or disruption, in addition to the usual factors such as rate or amount of resources allocated, location of the parties involved in the session, session type, etc. For example, in some embodiments, the RATM 309 may determine the appropriate subscriber charging rate by determining base charging rate, determining charging rate adapted to network conditions (CRANC), and determining charging rate adapted to service quality (CRASQ). The RATM 309 may then store the value of CRASQ as the subscriber charging rate (SUBSC_CHG_RATE). Additionally, in case of a session involving another operator's network, the RATM 309 may send a request to the DORM 311 to finalize the charging rate (FINALIZE_CHG_RQST) along with the determined CRASQ. The RATM 309 may then continue performing process described in step 503 below. Alternatively, in case of a session involving single network, the RATM 309 may send a request to the SBCM 306, The RATM 309 may then continue performing process described in step 503 below.

As will be appreciated, the RATM 309 may determine base charging rate (BCR) as a function (bcr_compute_function) of allocated resources (AR), session type (ST), location of parties involved in the session (LCP), time of day (TOD), and roaming status of served user (RS). The allocated resources (AR) may be in terms of bandwidth (e.g., 10 Mbps) or volume (e.g., 1 Gb) in which case appropriate rate of consumption factor may be determined (e.g., based on user category, session type—real-time or non-real-time, or default values). Additionally, session type (ST) may be voice, video call, file transfer protocol (ftp), real-time video or download, non-real-time video or download, fax, etc. Further, location of parties (LCP) may be expressed, for example, as 'intra-zonal session', 'inter-zonal session', 'inter-regional session', 'national session', 'international session'. Similarly, the time of day (TOD) may be, for example, peak hours (8:30-10:30 a.m and 6:00-8:00 p.m), non-peak hours (6:00-8:30 a.m, 10:30-6:00 p.m, 8:00-11 p.m), and night hours (11 p.m-6 a.m). The Bcr_compute_function may be a simple lookup table of provisioned rate based on the input parameters listed, or it could involve linear, quadratic or other complex calculations involving the parameters and scaling factors (e.g., for roaming status).

The RATM 309 may determine CRANC based on BCR, estimated network conditions factor (ENCF), and network conditions tuning factor (NCTF). For example, the CRANC may be determined as per equation (2) below:

$$CRANC = BCR * ENCF * NCTF \qquad \text{Equation (2)}$$

The ENCF may be determined based on the estimated resource occupancy levels (obtained from the estimated network conditions) using a linear or quadratic equation, or may be determined based on pre-configured look-up table such as the following:

| Estimated Average Network Resource Occupancy Level | Scaling Factor |
|---|---|
| <10% | 0.5 |
| 11-25% | 0.7 |
| 26-40% | 0.8 |
| 41-55% | 1.0 |
| 56-70% | 1.02 |
| 71-85% | 1.5 |
| >85% | 2.0 |

The estimated average network resource occupancy levels may be an average of resource occupancy levels of the key NEs involved in the service-session. For example, in case of an IMS call, it could include S-CSCF, MGW, MRF, etc. The NCTF may be determined based on historical data. Initially, NCTF may be provisioned as 1. Subsequently, NCTF may be updated based on learnings from the service-session as will be described in greater detail with respect to step 505.

The RATM 309 may determine CRASQ based on CRANC, service quality degradation or service disruption factor (SQD_SDF), and service quality degradation or disruption tuning factor (SQDTF). For example, the CRASQ may be determined as per equation (3) below:

$$CRASQ = CRANC * SQD\_SDF * SQDTF \qquad \text{Equation (3)}$$

The SQD_SDF may be determined based on the estimated duration for which service quality may be degraded and/or the estimated duration for which service may be disrupted. For example, the SQD_SDF may be determined as a linear or polynomial factor of the estimated duration for which service quality may be degraded and the estimated duration for which service may be disrupted expressed as a ratio (or %) of the estimated service-session duration. For example, the SQD_SDF may be determined using a set of pre-provisioned scaling factors as per equation (4) below:

$$SQD\_SDF = (\text{Scaling factor1} + \text{Scaling Factor 2})/2 \qquad \text{Equation (4)}$$

Examples of pre-provisioned scaling factors may be provided in tables below:

| Estimated Service Quality Degradation Duration (%) | Scaling Factor1 |
|---|---|
| <10% | 1.0 |
| 11-40% | 0.95 |
| 41-70% | 0.9 |
| 71-90% | 0.85 |
| >90% | 0.8 |

| Estimated Service Quality Disruption Duration (%) | Scaling Factor2 |
|---|---|
| <10% | 1.0 |
| 11-40% | 0.9 |
| 41-70% | 0.8 |
| 71-90% | 0.7 |
| >90% | 0.5 |

The SQDTF may be determined based on historical data. Initially, SQDTF may be provisioned as 1. Subsequently, SQDTF may be updated based on learnings from the service-session as will be described in greater detail with respect to step 505.

At step 503, the DORM in each network (involved in the service-session) except the source or originating network may finalize the inter-network charging rate using an appropriate logic in accordance with aspects of the present disclosure. For example, in some embodiments, the DORM in each succeeding network may send the DORM_REQUEST further to next succeeding networks, adjust the inter-network charging rate, and send the inter-network charging rate to preceding network. As will be appreciated, the DORM in each succeeding network may perform same actions until the DORM_REQUEST reaches the DORM of the destination or terminating network. It should be noted that, in some embodiments, the source network may be a network where the communication session is originating, while the destination network may be a network where the communication session is terminating.

Thus, upon receiving the DORM_REQUEST from the originating network, the DORM in the succeeding network may send the DORM_REQUEST to the DORM in the next succeeding network involved in the service-session based on the network identification information present in the received DORM_REQUEST. The DORM in the succeeding network may then start the DORM_RSP_TIMER to wait for DORM_RSP from the next succeeding network. The DORM may further fetch the estimated network conditions determined by the NCEM 313 by invoking the process described at step 506 above. It should be noted that, while fetching the estimated network conditions, the DORM may skip the network conditions of the NEs which interconnect with the preceding or succeeding network involved in the service-session. Further, the DORM may trigger the SQEM 315 to estimate the service quality degradation or disruption for the estimated service duration (received in the DORM_REQUEST) by invoking the process described at step 509 above. The DORM may then determine the inter-network charging rate (INC_RATE) based on allocated resource, session type, bi-lateral agreements, etc. Further, the DORM may initiate monitoring of network conditions (if not active already), as well as of service quality degradation or disruption during the service-session. This monitoring may be done using information collected by the OSS 317 in the network.

Upon receiving the DORM_REQUEST from the preceding network, the DORM in the terminating network may determine the inter-network charging rate (INC_RATE) based on allocated resource, session type, bi-lateral agreements, etc. The DORM in the terminating network may then determine adapted inter-network charging rate (ADAPT_INC_RATE) based on INC_RATE and DOR scaling factor (DOR_SCF). For example, the ADAPT_INC_RATE may be determined as per equation (5) below:

$$\text{ADAPT\_INC\_RATE} = \text{INC\_RATE} * \text{DOR\_SCF} \qquad \text{Equation (5)}$$

The DOR_SCF may be dependent on estimated network resource occupancy level and estimated service quality degradation or disruption due to issues within the current (i.e., terminating) network. For example, DOR_SCF may be determined using a set of pre-provisioned scaling factors as per equation (6) below:

$$\text{SCF} = (\text{DOR\_SFC1} + \text{DOR\_SCF2})/2 \qquad \text{Equation (6)}$$

Examples of pre-provisioned scaling factors may be provided in tables below:

| Estimated Average Network Resource Occupancy Level | DOR_SCF1 |
|---|---|
| <10% | 0.7 |
| 11-30% | 0.75 |
| 31-50% | 0.8 |
| 51-70% | 1.0 |
| 71-85% | 1.2 |
| >85% | 1.5 |

| Estimated Service Quality Degradation or Disruption (%) | DOR_SCF2 |
|---|---|
| <10% | 1.0 |
| 11-40% | 0.9 |
| 41-70% | 0.8 |
| 71-90% | 0.7 |
| >90% | 0.6 |

The DORM in the terminating network may then send the ADAPT_INC_RATE as the finalized inter-network charging rate (FINALIZED_INC_RATE) in the DORM_RSP message to the DORM of the preceding network involved in the service-session (i.e., to the DORM that sent the DORM_REQUEST). The DORM in the preceding network may store the received FINALIZED_INC_RATE as RECD_ADAPT_INC_RATE. Additionally, the DORM in the preceding network may adapt its own INC_RATE to obtain OWN_ADAPT_INC_RATE using a process similar to that described above for the DORM in the terminating network. It should be noted that the estimated network resource occupancy level and estimated service quality degradation or disruption may be the data that has been estimated for the current network. The DORM in the preceding network may then determine FINALIZED_INC_RATE by making adjustments to OWN_ADAPT_INC_RATE based on the RECD_ADAPT_INC_RATE. As will be appreciated, the adjustment may reflect the resource occupancy and service quality impact by the succeeding network. For example, the DORM may determine FINALIZED_INC_RATE as per equation (7) below:

$$\text{FINALIZED\_INC\_RATE} = \text{OWN\_ADAPT\_INC\_RATE} + (\text{STD\_INC\_RATE} - \text{RECD\_ADAPT\_INC\_RATE}) * \text{ADAPT\_RATE\_SCF} \qquad \text{Equation (7)}$$

The STD_INC_RATE may be the inter-network charging rate of the succeeding network without any adaptations and may be obtained from provisioned data. Further, the ADAPT_RATE_SCF may be a scaling factor (on a scale of 0 to 1) which reflects the extent of influence the change in succeeding network's inter-network charging rate (as compared to the standard rate) shall influence the current network's inter-network charging rate towards its preceding network. For example, the ADAPT_RATE_SCF may be 0.5.

The DORM in the preceding network may then send the FINALIZED_INC_RATE to its preceding network. As will be appreciated, the above process of determining FINALIZED_INC_RATE by each preceding network and transmitting it backwards (in DORM_RSP) may continue until the originating network's succeeding network may send its FINALIZED_INC_RATE to the DORM 311 of the originating network. It should be noted that, in case any network (except the originating network) fails to receive the DORM_RSP before the expiry of DORM_RSP_TIMER, then the DORM of that network may determine the FINALIZED_INC_RATE as per equation (8) below:

$$\text{FINALIZED\_INC\_RATE} = \text{OWN\_ADAPT\_INC\_RATE} + \text{INC\_FACTOR} \qquad \text{Equation (8)}$$

INC_FACTOR is a factor that may be initially provisioned by the operator and may be tuned thereafter based on learnings from the service-session as will be described in step 505.

Now, there may be three scenarios when the DORM 311 in the originating network may receive finalize charging rate request (FINALIZE_CHG_RQST) from the RATM 309 containing the CRASQ information. In a first scenario, DORM 311 in the originating network may have already received DORM_RSP (which is the response to the DORM_REQUEST) from the succeeding network. The DORM 311 may then determine the finalized subscriber charging rate (FINALIZED_SUBSC_CHG_RATE), for example, as per equation (9) below:

$$\text{FINALIZED\_SUBSC\_CHG\_RATE} = \text{SUBSC\_CHG\_RATE} + (\text{STD\_INC\_RATE} - \text{FINALIZED\_INC\_RATE}) * \text{SUBSC\_SCF} \qquad \text{Equation (9)}$$

The SUBSC_CHG_RATE may be determined as described in step 510 above. As stated above, the STD_IN- C_RATE may be the inter-network charging rate of the succeeding network without any adaptations and may be obtained from provisioned data. Additionally, FINALIZED_INC_RATE may be the inter-network charging rate as received from the DORM of the succeeding network. It may be the adapted inter-network charging rate. Moreover, SUBSC_SCF is a scaling factor between 0 and 1, reflecting the extent to which the difference in succeeding network's inter-network charging rate (as compared to the standard rate) may influence the charge to the subscriber. For example, SUBSC_SCF may be 0.4. It should be noted that SUBSC_SCF may be provisioned as part of policy. The DORM 311 may then send the FINALIZED_SUBSC_CHG_RATE to the RATM 309.

In a second scenario, the DORM 311 in the originating network may not have received DORM_RSP from the succeeding network and DORM_RSP_TIMER has expired. The DORM 311 may then determine FINALIZED_SUBSC_CHG_RATE by adapting the SUBSC_CHG_RATE, for example, as per equation (10) below:

$$FINALIZED\_SUBSC\_CHG\_RATE = SUBSC\_CHG\_RATE + CURR\_DOR\_SCF \quad \text{Equation (10)}$$

CURR_DOR_SCF is a factor that may be initially provisioned by the operator and may be tuned thereafter based on learnings from the service-session as will be described in step 505. The DORM 311 may then send the FINALIZED_SUBSC_CHG_RATE to the RATM 309. Subsequently, when the DORM 311 in the originating network may receive the DORM_RSP from the DORM in the succeeding network, the DORM 311 may determine a DOR_DELTA as per equation (11) below:

$$DOR\_DELTA = \text{Average } \{(STD\_INC\_RATE - FINALIZED\_INC\_RATE) \text{ of last 'n' sessions}\} - \{(STD\_INC\_RATE - FINALIZED\_INC\_RATE \text{ received from DORM of succeeding network})\} \quad \text{Equation (11)}$$

The DORM 311 in the originating network may then decide to adapt the FINALIZED_SUBSC_CHG_RATE in the following cases:

(a) If DOR_DELTA>pre-defined threshold alpha (e.g., 10%, both positive and negative values), and
(b) If DOR_DELTA>pre-defined threshold beta (e.g., 5%, both positive and negative values) AND the remaining session duration>pre-defined threshold (T_thr) (e.g., 10 minutes). It should be noted that beta<alpha.

The DORM 311 may then send the adapted FINALIZED_SUBSC_CHG_RATE to the RATM 309.

In a third scenario, the DORM 311 in the originating network may not have received DORM_RSP from the succeeding network, but the DORM_RSP_TIMER may be still running. The DORM 311 may then wait until the receipt of DORM_RSP from the succeeding network, or until expiry of DORM_RSP_TIMER. Based on whichever happens first (receipt of DORM_RSP or expiry of DORM_RSP_TIMER), the process described in the first scenario or the second scenario respectively may be performed.

At step 504, the RATM 309 may send the FINALIZED_SUBSC_CHG_RATE received from the DORM 311, upon receiving the same, to the SBCM 306, which in turn may send relevant information to the CTFs to initiate online charging for the session. The RATM 309 may also send details of estimated session duration, estimated network conditions, and estimated service-session quality levels (and any estimated disruptions or degradations and their durations) to the SBCM 306. The SBCM 306 may then activate monitoring of events and parameter values for the session and comparing them with their corresponding thresholds. The information reported from the OSS 317 and CTFs during the session may be stored by the DCM 312 in the FM, PM data portion of the volatile memory. Examples of the parameters and events that the SBCM 306 may monitor (so as to trigger appropriate actions based on certain conditions) may be provided in a table below. The SBCM may do the monitoring and checking whether conditions for triggering actions are met e.g., by creating a monitoring context which wakes up periodically or upon occurrence of a specific event to process the collected information.

| Prameter/ Event monitored | Data source | Condition for triggering appropriate action | Typical frequency of montering |
|---|---|---|---|
| Session duration | Local timer (which may be stopped upon receiving session end notification) | {(Session duration — estimated session duration)/Estimated session duration}> ESTIM_SESS_DUR_THRESHOLD | Once every 'k' minutes, where 'k' is configurable and may be a value between 5-15 minutes |
| Network conditions (resource occupancy levels and congestion indications) | OSS (it may also come from the CTFs/NEs directly) | {(Network conditions — estimated network conditions)/Estimated network conditions}> ESTIM_NTW_COND_THRESHOLD | Once every 'k' minutes, where 'k' is configurable and may be a value between 5-15 minutes |
| Service-session quality/KPIs | OSS (it may also come from the CTFs/NEs directly) | {(service quality degradation or disruption duration — estimated service quality degradation or disruption duration)/estimated service quality degradation or disruption duration}> ESTIM_SERV_DISRUPT_DEGRAD_THRESHOLD | Once every 'k' minutes, where 'k' is configurable and may be a value between 5-15 minutes |

| Parameter/ Event monitored | Data source | Condition for triggering appropriate action | Typical frequency of monitering |
|---|---|---|---|
| Session characteristics | Event/trigger to the OCS from the CIFs | Any change that may require change in resource allotment such as more bandwidth, new media type, change in access network type, addition of a user, etc. | Upon occurrence of the event |

The estimated session duration may be obtained from step 507, while the estimated service quality degradation or disruption may be obtained from step 509. Similarly, the estimated network conditions may be obtained from step 506. It should be noted that the difference between actual and estimated network conditions may also be taken as an average over all the intervals since the start of the service-session until the instant when the difference may be computed. Further, the estimated session duration threshold (ESTIM_SESS_DUR_THRESHOLD), the estimated network condition threshold (ESTIM_NTW_COND_THRESHOLD), and the estimated service quality disruption/degradation threshold (ESTIM_SERV_DISRUPT_DEGRAD_THRESHOLD) may be pre-provisioned % values, which may be updated based on learnings from the service-session as will be described in greater detail with respect to step 505. It should be noted that the thresholds may be defined in such a way that there may be no frequent toggling of charging rate due to frequent re-determination of the charging rate.

When one or more conditions for triggering appropriate action as provided in the table are met, the SBCM 306 may trigger the RATM 309 with relevant information (e.g., current session duration, modified session characteristics) so as to determine the rating for the session. The RATM 309 may then triggers the SQEM 315 to provide estimation of service quality degradation or disruption for next 'k' intervals by invoking the process described at step 509 above. The value of 'k' may be determined by examining historical data of sessions whose actual service-session duration exceeded the estimated service-session duration, and taking a weighted average of the difference between actual service-session duration exceeded the estimated service-session duration. It should be noted that different weights may be applied based on the session characteristics, location of the served user, etc. The weights may be learnt through machine-learning techniques or analytics techniques, or may be simply provisioned.

The RATM 309 may then determine the subscriber charging rate (SUBSC_CHG_RATE) by invoking the process described at step 510 above. The RATM 309 may then determine the adapted subscriber charging rate (ADAPT_SUBSC_CHG_RATE) by adapting the SUBSC_CHG_RATE, for example, as per equation (12) below:

$$\text{ADAPT\_SUBSC\_CHG\_RATE} = \text{SUBSC\_CHG\_RATE} + (\text{SUBSC\_CHG\_RATE} * \text{Average (Actual network conditions} - \text{estimated network conditions)} * \text{NTW\_COND\_DELTA\_SCF}) + (\text{SUBSC\_CHG\_RATE} * \text{Average (Actual duration of service quality degradation/disruption} - \text{estimated duration of service quality degradation/disruption)} * \text{SERV\_QUAL\_DELTA\_SCF}) \quad \text{Equation (12)}$$

It should be noted that the averages may be taken from the instant when the last adaptation to the SUBC_CHG_RATE was done. Further, the actual network conditions may be network conditions observed during the ongoing session, while the estimated network conditions may be the estimate of network conditions which was used for the previous determination of SUBSC_CHG_RATE. The NTW_COND_DELTA_SCF may be a scaling factor (0 to 1), which may be pre-provisioned. Similarly, the SERV_QUAL_DELTA_SCF may be a scaling factor (0 to 1), which may be pre-provisioned. Moreover, the estimated duration of service quality degradation/disruption may be the estimate of duration of service quality degradation/disruption duration which was used for the previous determination of SUBSC_CHG_RATE.

The RATM 309 may then send the ADAPT_SUBSC_CHG_RATE to the DORM 311 for finalizing the subscriber charging rate based on adapted inter-network charging rate. The RATM 309 may then overwrite the earlier value of SUBSC_CHG_RATE with the value of ADAPT_SUBSC_CHG_RATE in its local memory. The DORM 311 may finalize the subscriber charging rate based on the SUBSC_CHG_RATE, for example, as per equation (13) below:

$$\text{FINALIZED\_SUBSC\_CHG\_RATE} = \text{ADAPT\_SUBSC\_CHG\_RATE} + (\text{STD\_INC\_RATE} - \text{FINALIZED\_INC\_RATE}) * \text{SUBSC\_SCF} \quad \text{Equation (13)}$$

The ADAPT_SUBSC_CHG_RATE may be determined as described above. The STD_INC_RATE may be the inter-network charging rate of the succeeding network without any adaptations and may be obtained from provisioned data. Additionally, the FINALIZED_INC_RATE may be the inter-network charging rate as received from the DORM of the succeeding network. It should be noted that the FINALIZED_INC_RATE may be the adapted inter-network charging rate. Further, the SUBSC_SCF may be a scaling factor between 0 and 1, reflecting the extent to which the difference in succeeding network's inter-network charging rate (as compared to the standard rate) shall influence the charge to the subscriber. For example, SUBSC_SCF could be 0.4. It should be noted that SUBSC_SCF may be provisioned as part of policy.

The DORM 311 may then provide the new value of FINALIZED_SUBSC_CHG_RATE to the RATM 309. The RATM 309 may check the difference between the newly determined FINALIZED_SUBSC_CHG_RATE and the previous value of FINALIZED_SUBSC_CHG_RATE, and in case the difference is greater than a certain threshold, the RATM 309 may provide the new FINALIZED_SUBSC_CHG_RATE to the SBCM 306. In order to avoid frequent change in charging rate, the RATM 309 may also check the timestamp of the last charging rate update due to factors other than change in session characteristics, and may inform the SBCM 306 only when the time difference is more than a certain threshold value (e.g., 5 minutes). The SBCM 306 may then send relevant info to the CTFs about the new FINALIZED_SUBSC_CHG_RATE. It should be noted that, as part of the monitoring actions, the SBCM 306 may also store information about the network conditions and network/service outages in the non-volatile as well as in the volatile memory of the OCS 300.

In some embodiments, updating learning from the service-session at step 505 further includes updating historical data with service-session information at step 511, and automatically tuning values and thresholds for various parameters at step 512.

At step 511, at the end of the session, the SBCM 306 in the originating network may store all relevant data about the session, including session characteristics, session duraton, service quality degradation or disruption duration, etc. in the non-volatile memory. Additionally, the RATM 309 may stores information about the SUBSC_CHG_RATE determined during the session for future use. Further, the DORM may store information about the FINALIZED_CHG_RATE and FINALIZED_INC_RATE received from the succeeding network.

At step 512, the RATM 309 may adapt the parameter values and thresholds of relevant parameters used in computing the SUBSC_CHG_RATE based on the observations during the current service-session. For example, the RATM 309 may adapt the following parameter values and thresholds:

(a) Service-session duration tuning factor (SSDTF): The initial provisioned value of this factor may be 1. At the end of each service-session, the RATM 309 may tune its value based on weighted average of the difference between the actual service-session duration and the estimated service-session duration for the last sessions including the service-session that ended just now, with different weights assigned to, for example, most recent sessions, similar session types (voice, video, etc.), sessions involving the same users, etc.

(b) Network conditions tuning factor (NCTF): The initial provisioned value of this factor may be 1. Subsequently, at the end of each service-session, the RATM 309 may adapt it based on weighted average of difference between actual network conditions during the service-session and the estimated network conditions for the last 'p' sessions including the service-session that just ended, with different weights assigned to, for example, most recent sessions, sessions occurring in the same time of the day, sessions involving the same network segments, etc.

(c) Service quality degradation or disruption tuning factor (SQDTF): The initial provisioned value of this factor may be 1. Subsequently, at the end of each service-session, the RATM 309 may adapt it based on weighted average of difference between actual service quality degradation or disruption encountered during the service-session and the estimated values for the last 'k' sessions including the service-session that ended just now, with different weights assigned to, for example, most recent sessions, sessions with similar or same session characteristics, sessions for whom the network conditions were similar, etc.

Additionally, the RATM 309 may adapt the subscriber tariffs. The RATM 309 in the originating network may determine the accuracy of the determined (finalized) subscriber charging rate as follows:

(a) Based on the actual service-session duration, network conditions and actual service quality degradations/disruption duration during the service-session, the RATM 309 may determine the subscriber rate of charging (ACTUAL_SUBC_CHG_RATE) as described in step 510 with the following modifications:

i. Use actual service duration, actual network conditions, and actual service quality degradations or disruption duration instead of the corresponding estimated values.

ii. The tuning factors (i.e., SSDTF, NCTF, SQDTF) may be assigned value of 1 for the determination.

If the session characteristics had changed during the service-session, then RATM 309 may determine ACTUAL_SUBSC_CHG_RATE for every such change, and may take a weighted average, with weights being applied based on the duration for which the service characteristic was applicable.

(b) The RATM 309 may then trigger the DORM to determine finalized subscriber charging rate passing the determined ACTUAL_SUBC_CHG_RATE and based on the received inter-network charging rate from the succeeding network.

(c) The RATM 309 may then determine the difference between FINALIZED_SUBSC_CHG_RATE and ACTUAL_SUBSC_CHG_RATE. In case different FINALIZED_SUBSC_CHG_RATE had been applied during the service-session due to any reason, the RATM 309 may take the weighted average of FINALIZED_SUBSC_RATE, with the weights being distributed based on the duration for which each value of FINALIZED_SUBSC_RATE was applied.

As will be appreciated, there may be one or more reasons for application of different FINALIZED_SUBSC_CHG_RATE during the service-session. For example, the application of different FINALIZED_SUBSC_CHG_RATE may have been due to:

(a) Change in at least one of network conditions, service-session duration, service quality degradation or disruption duration from their respective estimated values beyond their corresponding thresholds. As stated above, in such case, the RATM 309 may take the weighted average of FINALIZED_SUBSC_CHG_RATE, with the weights being distributed based on the duration for which each value of FINALIZED_SUBSC_CHG_RATE was applied; and/or (b) Change in service characteristics.

In case the difference between the FINALIZED_SUBSC_CHG_RATE and ACTUAL_SUBSC_CHG_RATE may be more than a certain provisioned threshold %, then the RATM 309 may modify the configured tariff rates by a certain factor (Lambda) determined, for example, as per equation (14) below:

$$\text{Lambda} = \text{Delta} * \text{weighted average of the sum of accuracy \% for last 'p' sessions (which may include positive and negative values) with higher weights assigned to recent sessions} \quad \text{Equation (14)}$$

It should be noted that 'Delta' may be determined from a look-up table. The RATM 309 may also notify the OSS 317 when it makes an adaptation to the subscriber tariffs.

Further, the SBCM 306 in the originating network may adapt the thresholds for triggering re-determination of subscriber charging rate based on the number of times the charging rate was increased and/or decreased, with the objective of optimizing the frequency of changes. For example, if the same condition triggered an increase and a decrease successively during the session, the SBCM 306 may increase the threshold for that condition by a pre-provisioned factor, and if error in charging rate (charging rate taking actual network conditions and service quality degradation/disruption duration) was greater than a certain pre-provisioned threshold (%), the SBCM 306 may decrease the threshold for all conditions by a pre-provisioned factor.

Further, the DORM 311 in the originating network may adjust the CURR_DOR_SCF parameter, for example, as per equation (15) below:

CURR_DOR_SCF=(STD_INC_RATE−FINALIZED_
INC_RATE)*SUBSC_SCF averaged over last
'n' sessions (where 'n' is pre-provisioned)
including the service-session that just ended     Equation (15)

The STD_INC_RATE, FINALIZED_INC_RATE and SUBSC_SCF are the parameters described in step 503 above. The averaging may be done simply over similar sessions (e.g., same user, same session characteristics, same time of day, etc.), or across all past sessions in case sufficient samples are not available. Further, the average may also be a weighted one, with higher weights assigned to more recent sessions, etc.

Moreover, the DORM in all networks involved in the service-session except the originating and the terminating networks may adapt the INC_FACTOR described in step 503, for example, as per equation (16) below:

INC_FACTOR=(STD_INC_RATE−FINALIZED_IN-
C_RATE)*ADAPT_RATE_SCF averaged over
last 'n' sessions (where 'n' is pre-provisioned)
including the service-session that just ended     Equation (17)

The INC_FACTOR, STD_INC_RATE, FINALIZED_INC_RATE, and ADAPT_RATE_SCF are parameters described in step 503 above. The averaging may be done simply over similar sessions (e.g., same user, same session characteristics, same time of day, etc.), or across all past sessions in case sufficient samples are not available. Further, the average may also be a weighted one, with higher weights assigned to more recent sessions, etc.

Thus, the techniques described in the embodiments discussed above provide for dynamic determination of charging rate (intra or across-networks) for a service-session such that the determined charging rate may be commensurate with delivered service quality. In particular, the techniques enable the charging system to determine appropriate amount proposed to be charged for the projected service consumption for a session initiated, by taking into consideration desired service quality for the session. The techniques therefore provide for dynamic charging (intra and across networks) of the service-session commensurate with delivered service quality.

As described in detail above with respect to FIG. 5, in some embodiments, the dynamic determination of charging rate may be achieved by:

(a) Estimating, by the SSDEM 314 in the originating network (source-network), the duration of the service-session as described in step 507, and communicating the estimated duration, by the DORM 311 to all the networks involved in the service-session as described in steps 506 and 508.

(b) Estimating, by the NCEM 313 in all the networks involved in the service-session, the network congestion and resource consumption by the service-session for the estimated duration as described in step 506.

(c) Estimating, by the SQEM 315 in all the networks involved in the service-session, the network faults/ congestion and/or overloading during the service-session that causes service quality degradation and/or service disruption during the service-session as described in steps 509 and 503.

(d) Determining the subscriber rate of charging, by the RATM 309 in the originating network (source-network), based on (a), (b) and (c) as described in step 510.

(e) Determining the inter-network rate of charging, by the DORM 311 in the terminating network (destination-network) involved in the service-session, based on (b), (c), and the inputs received from the DORM 311 of the preceding network (service characteristics, duration of the service-session, etc.), and communicating the determined inter-network rate of charging with the preceding network involved in this service-session as described in step 503.

(f) Finalizing the inter-network rate of charging, by the DORM 311 in every network involved in the service-session (except the source and destination networks), based on (b), (c), the inputs received from the DORM 311 of the preceding network (service characteristics, duration of the service-session, etc.), and the inter-network charging rate received from the succeeding network involved in the service-session, and communicating the finalized inter-network rate of charging with the preceding network involved in this service-session as described in step 503, (g) Finalizing subscriber charging rate, by the DORM 311 in the source-network, based on (e) and the finalized internetwork charging-rate received from the succeeding network involved in the session as described in 503.

(h) Dynamically adapting the subscriber charging rate, by the RATM 309 in the source network, based on inputs from the SBCM 306 or EBCM 307 due to changes in network conditions and/or service quality levels as described in step 4 504.

(i) Assessing accuracy of determined inter-network charging rate based on actual network conditions, by the RATM 309 in the source network, and auto-tune parameters and thresholds for improved performance for future sessions by the RATM 309, SBCM 306 or EBCM 307, and DORM 311 as described in step 505.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
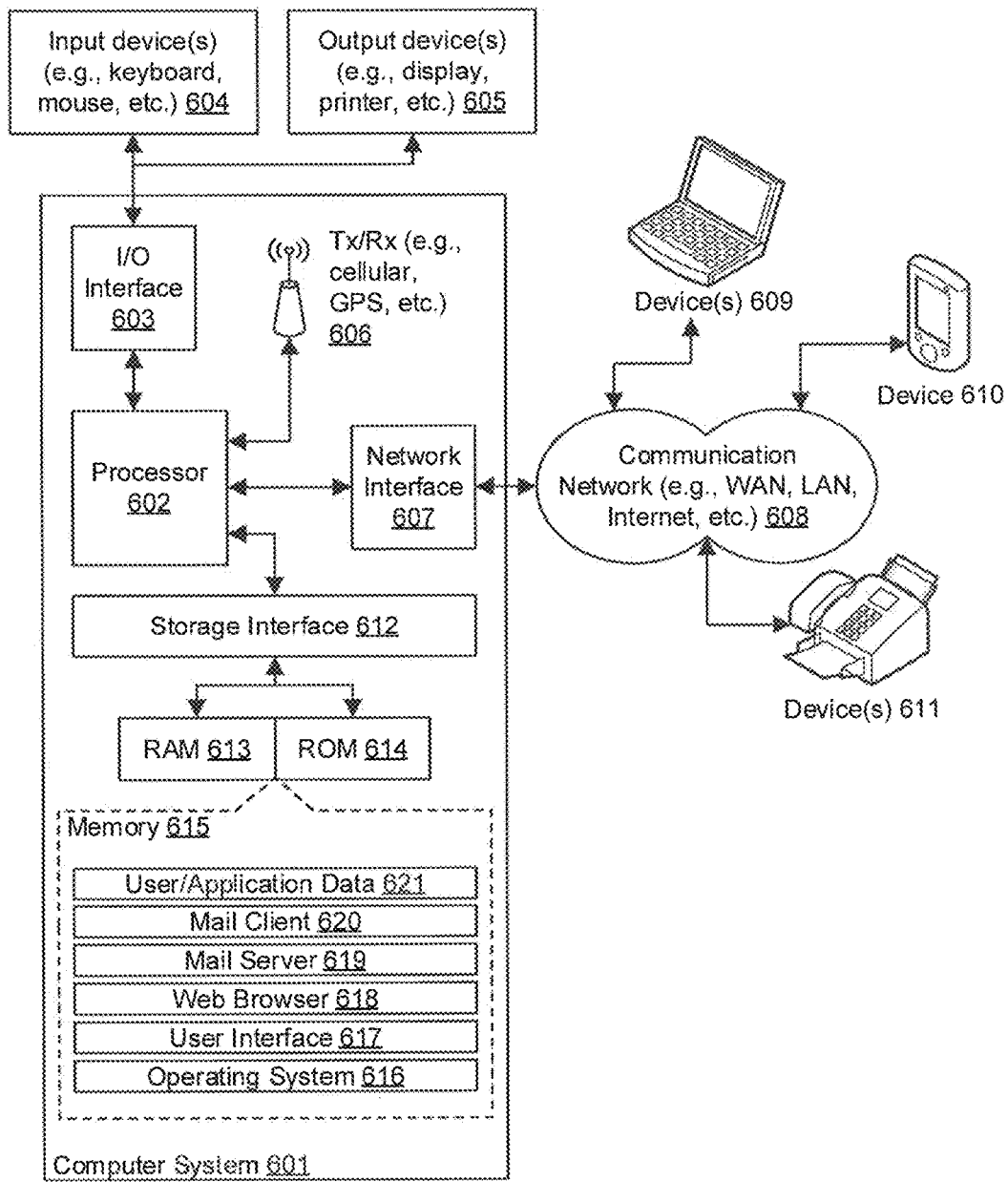
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing components of communication network 100, the OCS 300, for dynamic determination of charging rate and for dynamic charging based on the dynamically determined charging rate. Computer system 601 may include a central processing unit ("CPU" or "processor") 602. Processor 602 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD ATHLON, DURON or OPTERON, ARM's application, embedded or secure processors, IBM POWERPC, INTEL'S CORE, ITANIUM, XEON, CELERON or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-VIDEO, VGA, IEEE 802.n/b/g/n/x, BLUETOOTH, cellular (e.g., code-division multiple access (CDMA), high-speed packet access (HSPA+), global system for mobile communications (GSM), long-term evolution (LTE), WiMAX, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., TEXAS INSTRUMENTS WiLink WL1283, Broadcom BROADCOM BCM4750IUB8, INFINEON TECHNOLOGIES X-GOLD 618-PMB9800, or the like), providing IEEE 802.11a/b/g/n, BLUETOOTH, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, ETHERNET (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., APPLE IPHONE, BLACKBERRY, ANDROID-based phones, etc.), tablet computers, eBook readers (AMAZON KINDLE, NOOK, etc.), laptop computers, notebooks, gaming consoles (MICROSOFT XBOX, NINTENDO DS, SONY PLAYSTATION, etc.), or the like. In some embodiments, the computer system 501 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, APPLE Macintosh OS X, UNIX, UNIX-like system distributions (e.g., Berkeley Software Distribution (BSD), FreeBSD®, NetBSD®, OpenBSD®, etc.), Linux distributions (e.g., RED HAT, UBUNTU, KUBUNTU, etc.), IBM OS/2, MICROSOFT WINDOWS (XP, Vista/7/8, etc.), APPLE iOS, GOOGLE ANDROID, BLACKBERRY OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE Macintosh operating systems' Aqua, IBM OS/2, MICROSOFT WINDOWS (e.g., AERO, METRO, etc.), UNIX X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as MICROSOFT INTERNET EXPLORER, GOOGLE CHROME, MOZILLA FIREFOX, APPLE SAFARI, etc. Web browsers may utilize facilities such as AJAX, DHTML, ADOBE FLASH, JAVASCRIPT, JAVA, application programming interfaces (APIs), etc. In some embodiments, the computer system 601 may implement a mail server 619 stored program component. The mail server may be an Internet mail server such as Microsoft Exchange, or the like.

The mail server may utilize facilities such as ASP, ActiveX, ANSI C++/C#, MICROSOFT.NET, CGI scripts, JAVA, JAVASCRIPT, PERL, PHP, PYTHON, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as APPLE MAIL, MICROSOFT ENTOURAGE, MICROSOFT ENTOURAGE, Mozilla MOZILLA THUNDERBIRD, etc.

In some embodiments, computer system 601 may store user/application data 621, such as the data, variables, records, etc. (e.g., user characteristics, session characteristics, network conditions, provisioned inputs and thresholds, configuration data, estimated network condition, estimated duration, estimated service quality degradation or disruption, subscriber charging rate, and so forth) as described in this disclosure. Such databases may be implemented as fault-tolerant, relational, scalable, secure databases such as ORACLE or SYBASE. Alternatively, such databases may be implemented using standardized data structures, such as an array, hash, linked list, struct, structured text file (e.g., XML), table, or as object-oriented databases (e.g., using OBJECTSTORE, POET, ZOPE, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for a mechanism for dynamic determination of charging rate, and therefore for dynamic charging for intra network service-session as well as across network service-session. As will be appreciated by those skilled in the art, the techniques provides for effective dynamic charging by taking into consideration network load conditions during the entire session, delivered service quality, as well as dynamic charging across networks.

The specification has described system and method for dynamic charging in a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of dynamic charging in a communication network, the method comprising:
    upon initiation of a communication session, dynamically determining, by a network device, a charging rate for the communication session based on at least one of an estimated quality of service and a dynamically determined inter-network charging rate for the communication session, wherein dynamically determining the charging rate comprises:
        determining an estimated network condition for each of a plurality of network segments involved in the communication session; and
        determining an estimated duration of the communication session by:
            accessing historical data and current data with respect to at least resource occupancy levels and congestion indications for the network segment; and
            determining the estimated network condition for the network segment based on the historical data and the current data using a predictive model;
    initiating, by the network device, charging for the communication session based on the determined charging rate;
    monitoring, by the network device, at least an actual quality of service for the communication session with respect to the estimated quality of service for a duration of the communication session; and
    dynamically updating, by the network device, the determined charging rate based on the monitoring.

2. The method of claim 1, wherein determining the estimated duration of the communication session comprises:
    accessing historical data and current data with respect to at least one of a user characteristic, a session characteristic, or an event characteristic for the communication session;
    determining an initial estimated duration of the communication session based on the historical data and the current data using a predictive model; and
    determining the estimated duration of the communication session based on the initial estimated duration and the estimated network condition for at least one of the plurality of network segments.

3. The method of claim 1, further comprising determining the estimated quality of service by:
    accessing historical data with respect to at least one of network outages, a network condition, or a quality of service for at least one of the plurality of network segment, and historical data and current data with respect to at least one of a session characteristic and an event characteristic for the communication session;
    determining estimated network outages for the estimated duration of the communication session and the estimated network condition for at least one of the plurality of network segment based on the historical data using a predictive model; and determining the estimated quality of service for the estimated duration of the communication session, the estimated network condition, and the estimated network outages for at least one of the plurality of network segment based on the historical data and the current data using a predictive model.

4. The method of claim 1, further comprising dynamically determining the inter-network charging rate for the communication session by:

determining an initial inter-network charging rate at a destination network segment for the estimated duration based on at least one of allocated resources, the estimated quality of service, or the estimated network condition at the destination network segment;

determining a subsequent inter-network charging rate at a preceding network segment based on at least one of allocated resources, the estimated quality of service, the estimated network condition at the preceding network segment, the initial inter-network charging rate, or a factor proportional to a difference between the inter-network charging rate received from the succeeding network segment and the provisioned inter-network charging rate of the succeeding network segment; and iterating determination of the subsequent inter-network charging rate for each of the plurality of preceding network segments till a source network segment.

5. The method of claim 1, wherein dynamically determining the charging rate for the communication session is further based on at least one of a base charging rate, and an estimated network condition for each of a plurality of network segments involved in the communication session.

6. The method of claim 1, wherein dynamically determining the charging rate for the communication session comprises:

determining a base charging rate based on at least one of a user characteristic, a session characteristic, allocated resources for the communication session, or a quality of service required for the communication session; and adjusting the base charging rate based on at least one of the estimated quality of service and the dynamically determined inter-network charging rate for an estimated duration of the communication session, and further based on an estimated network condition for each of a plurality of network segments involved in the communication session for the estimated duration of the communication session.

7. The method of claim 1, wherein dynamically updating the charging rate comprises dynamically determining a new charging rate for at least a part of an estimated duration of the communication session upon breaching a pre-provisioned threshold value for a difference between the actual quality of service and the estimated quality of service.

8. The method of claim 1, wherein monitoring further comprises monitoring at least one of:

an actual network condition with respect to an estimated network condition for each of a plurality of network segments involved in the communication session;

an actual duration with respect to an estimated duration of the communication session;

a session characteristic;

a user characteristic; or an event characteristic.

9. The method of claim 8, wherein dynamically updating the charging rate comprises dynamically determining a new charging rate for at least a part of an estimated duration of the communication session upon breaching a pre-provisioned threshold value for at least one of:

a difference between the actual network condition and the estimated network condition;

a difference between the actual duration and the estimated duration of the communication session;

a change in the session characteristic;

a change in the user characteristic; or a change in the event characteristic.

10. The method of claim 1, further comprising:

initiating a learning process upon termination of the communication session; and updating, based on the learning process, at least one of historical data with information about the communication session, a plurality of pre-provisioned threshold values for dynamic update of the charging rate, a base charging rate, or the inter-network charging rate for the communication session.

11. A system for dynamic charging in a communication network, the system comprising:

a processor, and a memory communicatively coupled to the processor, wherein the memory stores the processor-executable instructions, which, on execution, causes the processor to:

dynamically determine a charging rate for the communication session upon initiation of a communication session, based on at least one of an estimated quality of service and a dynamically determined inter-network charging rate for the communication session, wherein dynamically determining the charging rate comprises:

determining an estimated network condition for each of a plurality of network segments involved in the communication session; and determining an estimated duration of the communication session by:

accessing historical data and current data with respect to at least resource occupancy levels and congestion indications for the network segment; and determining the estimated network condition for the network segment based on the historical data and the current data using a predictive model;

initiating charging for the communication session based on the determined charging rate; and monitoring at least an actual quality of service for the communication session with respect to the estimated quality of service for a duration of the communication session, wherein the determined charging rate is dynamically updated based on the monitoring;

wherein the memory is further configured to store configuration data, session data, estimation data, and threshold data.

12. The system of claim 11, wherein the processor is further configured to determine the estimated duration of the communication session by:

accessing historical data and current data with respect to at least one of a user characteristic, a session characteristic, or an event characteristic for the communication session;

determining an initial estimated duration of the communication session based on the historical data and the current data using a predictive model; and determining the estimated duration of the communication session based on the initial estimated duration and the estimated network condition for at least one of the plurality of network segments.

13. The system of claim 11, wherein the processor is further configured to determine the estimated quality of service by:
   accessing historical data with respect to at least one of network outages, a network condition, or a quality of service for at least one of the plurality of network segment, and historical data and current data with respect to at least one of a session characteristic and an event characteristic for the communication session;
   determining estimated network outages for the estimated duration of the communication session and the estimated network condition for at least one of the plurality of network segment based on the historical data using a predictive model; and
   determining the estimated quality of service for the estimated duration of the communication session, the estimated network condition, and the estimated network outages for at least one of the plurality of network segment based on the historical data and the current data using a predictive model.

14. The system of claim 11, wherein the processor is further configured to dynamically determine the inter-network charging rate for the communication session by:
   determining an initial inter-network charging rate at a destination network segment for the estimated duration based on at least one of allocated resources, the estimated quality of service, or the estimated network condition at the destination network segment;
   determining a subsequent inter-network charging rate at a preceding network segment based on at least one of allocated resources, the estimated quality of service, the estimated network condition at the preceding network segment, the initial inter-network charging rate, or a factor proportional to a difference between the inter-network charging rate received from the succeeding network segment and the provisioned inter-network charging rate of the succeeding network segment; and
   iterating determination of the subsequent inter-network charging rate for each of the plurality of preceding network segments till a source network segment.

15. The system of claim 11, wherein the processor is further configured to dynamically determine the charging rate for the communication session by:
   determining a base charging rate based on at least one of a user characteristic, a session characteristic, allocated resources for the communication session, or a quality of service required for the communication session; and
   adjusting the base charging rate based on at least one of the estimated quality of service and the dynamically determined inter-network charging rate for an estimated duration of the communication session, and further based on an estimated network condition for each of a plurality of network segments involved in the communication session for the estimated duration of the communication session.

16. The system of claim 11, wherein the processor is further configured to dynamically update the charging rate by dynamically determining a new charging rate for at least a part of an estimated duration of the communication session upon breaching a pre-provisioned threshold value for a difference between the actual quality of service and the estimated quality of service.

17. The system of claim 11, wherein the processor is configured to monitor at least one of:
   an actual network condition with respect to an estimated network condition for each of a plurality of network segments involved in the communication session;
   an actual duration with respect to an estimated duration of the communication session;
   a session characteristic;
   a user characteristic; or
   an event characteristic.

18. The system of claim 17, wherein the processor is configured to dynamically update the charging rate by dynamically determining a new charging rate for at least a part of an estimated duration of the communication session upon breaching a pre-provisioned threshold value for at least one of:
   a difference between the actual network condition and the estimated network condition;
   a difference between the actual duration and the estimated duration of the communication session;
   a change in the session characteristic;
   a change in the user characteristic; or
   a change in the event characteristic.

19. The system of claim 11, wherein the processor is further configured to:
   initiate a learning process upon termination of the communication session; and
   update, based on the learning process, at least one of historical data with information about the communication session, a plurality of pre-provisioned threshold values for dynamic update of the charging rate, a base charging rate, or the inter-network charging rate for the communication session.

20. A non-transitory computer-readable medium storing computer-executable instructions for dynamic charging in a communication network, which when executed by at least one processor cause a device to perform operations comprising:
   upon initiation of a communication session, dynamically determining a charging rate for the communication session based on at least one of an estimated quality of service and a dynamically determined inter-network charging rate for the communication session, wherein dynamically determining the charging rate comprises:
      determining an estimated network condition for each of a plurality of network segments involved in the communication session; and
      determining an estimated duration of the communication session by:
         accessing historical data and current data with respect to at least resource occupancy levels and congestion indications for the network segment; and
         determining the estimated network condition for the network segment based on the historical data and the current data using a predictive model;
   initiating charging for the communication session based on the determined charging rate;
   monitoring at least an actual quality of service for the communication session with respect to the estimated quality of service for a duration of the communication session; and
   dynamically updating the determined charging rate based on the monitoring.

* * * * *